(12) United States Patent
Rogers

(10) Patent No.: US 8,322,332 B2
(45) Date of Patent: Dec. 4, 2012

(54) SELF-ERECTING GIMBAL MOUNTED SOLAR RADIATION COLLECTORS

(76) Inventor: William E. Rogers, Troy, NY (US)

( * ) Notice: Subject to any disclaimer, the term of this patent is extended or adjusted under 35 U.S.C. 154(b) by 11 days.

(21) Appl. No.: 12/941,296

(22) Filed: Nov. 8, 2010

(65) Prior Publication Data

US 2011/0056484 A1 Mar. 10, 2011

(51) Int. Cl.
*F24J 2/38* (2006.01)
(52) U.S. Cl. ........ 126/600; 126/601; 126/602; 126/603; 126/604; 126/605; 126/606; 126/607; 126/608; 343/757; 343/763; 343/766
(58) Field of Classification Search .......... 126/300–608; 343/757–766
See application file for complete search history.

(56) References Cited

U.S. PATENT DOCUMENTS

| | | | | |
|---|---|---|---|---|
| 509,392 A * | 11/1893 | Paine | ............................. | 126/607 |
| 670,916 A | 3/1901 | Eneas | | |
| 787,145 A | 4/1905 | Brown | | |
| 2,460,482 A | 2/1949 | Abbot | | |
| 4,011,854 A | 3/1977 | Brantley et al. | | |
| 4,171,876 A | 10/1979 | Wood | | |
| 4,194,492 A * | 3/1980 | Tremblay | ....................... | 126/601 |
| 4,227,464 A * | 10/1980 | Wallace | ......................... | 104/126 |
| 4,274,712 A * | 6/1981 | Sintes | ............................ | 359/850 |
| 4,312,326 A | 1/1982 | Johnson, Jr. | | |
| 4,334,480 A * | 6/1982 | Wallace | ......................... | 104/126 |
| 4,342,501 A | 8/1982 | Solomon | | |
| 4,402,500 A * | 9/1983 | Coles | ............................ | 472/17 |
| 4,466,423 A | 8/1984 | Dolan | | |
| 4,608,964 A | 9/1986 | Russo | | |
| 4,832,001 A | 5/1989 | Baer | | |
| 4,870,949 A | 10/1989 | Butler | | |
| 4,930,493 A | 6/1990 | Sallis | | |
| 5,269,728 A * | 12/1993 | Rogers et al. | ................. | 474/150 |
| 5,325,844 A | 7/1994 | Rogers | | |
| 6,557,804 B1 | 5/2003 | Carroll | | |
| 7,102,588 B1 * | 9/2006 | Phelan et al. | ................. | 343/882 |
| 7,596,843 B2 * | 10/2009 | Spishak et al. | ............... | 29/281.4 |
| 2004/0112373 A1 * | 6/2004 | Djeu | ............................. | 126/604 |
| 2005/0019142 A1 * | 1/2005 | Miles et al. | .................... | 414/460 |
| 2006/0284047 A1 * | 12/2006 | Spishak et al. | ................ | 248/637 |
| 2007/0075549 A1 * | 4/2007 | Mohring | ......................... | 290/55 |
| 2007/0095341 A1 * | 5/2007 | Kaneff | ........................... | 126/601 |
| 2008/0168981 A1 * | 7/2008 | Cummings et al. | ........... | 126/600 |
| 2009/0078248 A1 | 3/2009 | Brown | | |
| 2009/0277224 A1 * | 11/2009 | Angel et al. | .................... | 65/60.1 |
| 2010/0147286 A1 * | 6/2010 | Xiang et al. | .................... | 126/600 |
| 2011/0162637 A1 * | 7/2011 | Hahn | ............................ | 126/600 |

FOREIGN PATENT DOCUMENTS

DE 3418879 2/1986

* cited by examiner

*Primary Examiner* — Kenneth Rinehart
*Assistant Examiner* — Jorge Pereiro
(74) *Attorney, Agent, or Firm* — Young & Thompson

(57) ABSTRACT

A solar radiation collector system may includes a gimbal with a rim that supports a solar radiation concentrator or collector assembly passing through the plane of the rim, and foundation structures that support and anchor the gimbal, allowing it to both rotate and be raised or lowered. One flexible structural member may support the gimbal rim and a second flexible structural device both anchors the rim and enables the gimbal-collector assembly to rotate around an axis parallel to the earth's polar axis providing the desired primary tracking motion following the daily apparent motion of the sun. Motion between the gimbal and the solar radiation collector assembly allows the assembly to follow the apparent seasonal motion of the sun, among other tasks.

19 Claims, 23 Drawing Sheets

SELF-ERECTING GIMBAL MOUNTED SOLAR RADIATION COLLECTORS

BACKGROUND OF THE INVENTION

1. Field of the Invention

Electromagnetic radiation collector systems and, more particularly, solar radiation collector systems that include photovoltaic trackers, heliostats, solar furnaces, and point-focus collector systems.

2. Description of the Related Art

A typical related art concentrating solar collector system includes a concentrator having a suitable reflective surface which may be monolithic or formed from multiple individual mirrors, a receiver for absorbing the concentrated solar radiation, and associated support structures. Point-focus solar collector systems also require suitable primary and secondary tracking devices so that aligned mirrors can follow the apparent movement of the sun from dawn to dusk and through seasons. Such collector systems are arranged and constructed so that the sun's rays falling on reflective surfaces are directed into receivers to be utilized in any well known manner, such as heating a suitable circulating fluid which can be used to power an engine or be transported elsewhere for various uses, applying it directly to photovoltaic or other suitable direct energy conversion devices, utilizing it in a solar reactor for a variety of chemical processes, and the like. A receiver can be arranged to move with the concentrator or be fixed with respect to the moving concentrator assembly.

The related art is replete with a multitude of different designs of solar collector systems and tracking structures. Such related art systems have not been practicable and were typically complex, heavy and onerous to erect and service. Not a single one has met the commercial requirements of the marketplace. Current designs require subsidies for them to make economic sense, and these solar collectors typically take many years to replace the energy invested in materials and installation.

The related art has a variety of solar collectors that feature methods of lifting and lowering structures. For example, one type of technology can utilize a polar column hinged at the base and a pivoting equatorial mount to lift and lower a solar collector mounted between them. To support the concentrator and receiver, central structural devices with a shaft at each end have been suggested. An independent drive wheel or gear may rotate the concentrator to follow the sun. However, this type of technology does not accommodate solar seasonal motion. Another technology rotates the concentrator assembly around the receiver to track seasonal motion. Both these approaches would require very substantial central structures ending in significant shafts to accommodate the forces concentrated there into bearing devices at each end. Lacking adequate force distribution, wind and gravity loads would tend to twist and deform both kinds of structures.

The related art may utilize rings that are perpendicular to a right ascension, RA, axis that enable tracking in this dimension. Methods are also mentioned for tracking in declination. However, these related arts cannot transmit wind and gravity loads on the tracking structures into the foundations without great distortion nor do they illustrate alternative force distribution structures. None of the related art mentions associated foundation structures to raise and lower these solar collectors.

The related art illustrates ways to distribute gravity and wind forces involved in turntable-type structures that provide the primary tracking motion and that use integral accurate ring or rings to provide the secondary tracking motion. The related art may mention how to distribute loads in the secondary tracking structure. However, these forces have to be accommodated by the turntable arrangement that requires extensive foundations with a heavy accurate ring. One solution for field construction mentioned is to assemble the solar collector or heliostat in a building with required access to elevated assemblies and then to transport the completed unit to the site using heavy equipment. One of the related arts does not distribute forces in the secondary tracking structure but requires slender members that would rapidly fatigue, riding on four small rollers, and this approach would also require heavy equipment for erection. The very large offset overturning moments involved when high winds impact the elevated sail area of these concentrators would tend to pry both these approaches off turntable interfaces at ground level.

Multiple columns to raise and lower a concentrator have been suggested but this patent teaching would be primarily effective only near noon in tropical regions where the sun is nearly directly overhead. At other times and places, since the receiver is stationary, it would be difficult to get the concentrator shape appropriate for off-axis conditions. The reflective surface always faces skyward and, with multiple independent cable winches, would be extremely difficult to control. The associated receiver would require heavy equipment for installation. There seems to be no mechanism for stabilizing this kind of concentrator so that regions do not invert, like an inside-out umbrella, in high winds.

Another technology encountered major problems while trying to support a curved rim on two rollers. To prevent metal fatigue from concentrated forces at the two rollers, the curved structural member either has to be very robust and preferably heat treated like a railroad rail or the rollers have to be soft, like a rubber tire. In addition, not only were these large curved members difficult to form and transport, mounting an assembled solar collector on the columns required heavy equipment. Suspending the curved rim on multiple rollers mounted on a chain, in roller-chain style, between two columns did distribute the load but, mounted at the angle required for installations in the US, keeping the rollers tracking properly proved difficult. Although this method would work near the equator, where the curved rim is almost vertical, it is difficult to support the rollers working with RA axes at higher latitudes. It was also difficult, using this method of construction, to lift the structure off the ground.

Another technology which supports transducer devices on two polar columns provides supporting a third point on the tracking structure for providing stability and provides a way (tilting) to raise and lower the equipment. However such technology is used for supporting a heliostat and thus does not teach rotating an assembly to follow the sun, nor does it provide a way to operate in windy conditions.

Three issues have impeded deploying viable large solar collectors that harvest enough solar energy so they can become the preferred renewable energy resource:

1. Wind loads (managing forces on the structure, through drives and into the ground);
2. Hail, freezing rain, snow, frost and soiling (maintaining active area performance); and
3. High erection and maintenance costs (structure, interface and foundation approach).

Collecting significant amounts of solar energy requires a large area of reflector to redirect sunlight into a receiver. This reflector area acts like a sail and since they must follow the sun, concentrators at any orientation must transmit wind loads, coming from any direction, into the ground. To stay clean as possible, to prevent hail from damaging mirrors and to minimize exposure to wind, reflectors must face down when not operating. When facing skyward, hail may damage transducer elements (including both mirrors and photovoltaic approaches) and they accumulate dust, snow, freezing rain and frost. Because mirrors reflect and do not absorb radiation, sunlight warms them very slowly and ice deposits take a long time to melt, delaying operation and wasting energy. Utility-scale point-focus solar collectors (that have more than 800 square feet of reflector) and many smaller units all require heavy equipment both for erection and for repairing drives and bearings. Scheduling heavy equipment can be problematic. Cost to bring in a crane can exceed the value of energy a collector harvests in a year. Also, fossil carbon footprint accounting requires renewable energy equipment replace the resources used in manufacturing, construction and maintenance including fuel burned by heavy equipment. Erecting and repairing solar collectors should minimize using fossil fuel powered equipment.

Related art designs of heliostats and point-focus solar collectors utilize a variety of tall columns as in FIG. 1 through FIG. 3, or a turntable with elevated collector pivots as in FIG. 4. Each of these approaches requires a crane to lift and mount the collector assembly respectively between the columns, to the top of the single pedestal or between the elevated pivots of a turntable.

Referring now to the drawings, FIG. 1 and FIG. 2 illustrate two related art two-axis tracking, point focusing, solar collector systems 30 shown as equatorially oriented structures wherein systems have two motions: one, around the right ascension, RA, axis 49 parallel to the earth's polar axis and the other, around axes generally perpendicular to the RA axis. The solar radiation collector systems 30 include a main support structure 32 with a concentrator frame 36 for carrying one or more transducer elements. Reflective transducer elements 37 are supported and positioned either on transducer support members 43 connected with frame 36 in FIG. 1 or on linear transducer assemblies 41, seven in each of four quadrants, are illustrated in FIG. 2 to create a Fresnel reflective paraboloidal surface. These systems require suitable receivers 48 connected either to the main support structure 32 as shown in FIG. 1, or on dedicated support devices in front of the concentrator assembly 35 illustrated as two booms 40 in FIG. 2, so they move with the tracking structure. Receivers 48 are arranged for receiving the solar radiation directed from the transducer elements 37.

A desired primary tracking motion (right ascension) 49 rotates the main support structure with respect to the ground to counteract the rotating earth. The solar collector shown in FIG. 1 utilizes a friction drive roller 70 mounted on a motor-driven gear reducer of the right ascension drive 69 that directly turns the main support structure 32 around the RA axis 49. Shown in FIG. 2, the motor/gear reducer of the collector right ascension drive 69 that is fixed to the RA axis support 72 turns a small diameter sprocket that engages a drive wheel 71 attached to the main support structure 32.

To provide for the second motion (declination) 47 to adjust for the tilt of the earth responsible for seasonal changes in solar position, the transducer elements 37 are arranged and constructed to provide for the selective movement thereof with respect to the frames 36. That is, the reflective surface is of the dynamic Fresnel element type wherein the Fresnel mirrors, or other suitable transducer elements, are arranged to be selectively moved on axes generally perpendicular to the RA axis 49 to accommodate the seasonal variation of the solar position. Because the receiver 48 is typically on the optical axes of the two systems 30 illustrated in FIG. 1 and FIG. 2 only at equinox, the reflective surface, the mirror facets, or other transducer elements thereof must be adjusted to function properly at other times of the year. Conveniently, this can be achieved by moving facets individually, FIG. 1, by linear motion 68 of a member connecting rows of transducer elements 37 causing them to rotate or mounting the transducer elements on suitable transducer assemblies 41, FIG. 2, which are disposed within the frame 36 and provided with drive devices for selectively rotating them.

Although such related art dynamic Fresnel type concentrator solar collector systems have operated entirely satisfactorily with respect to the ability to concentrate and collect solar energy, they have remained too difficult to manufacture and erect to be entirely acceptable for many promising near term commercial applications. For example, such systems require either substantial columns to support large concentrators, or involve many foundations for both support columns and guy cables 53. The cables that anchor the columns to foundations and those mutually stabilizing the solar collector are difficult to see, especially in dim light, and avoiding them requires extraordinary care. Although the solar collector of FIG. 1 has three primary foundations: the two polar columns 59 and the equatorial foundation 52 with RA axis support 72, it also requires a foundation to anchor the tie down 64 that prevents wind from polar directions from overturning the assembly. The solar collector in FIG. 2 requires two polar foundations 50 and two equatorial foundations 52 to support the bifurcated polar structure 59 and RA axis support 72 along with six additional foundations to secure cable stays 53 to the ground.

FIG. 3 shows a typical point-focus solar collector mounted on a single pedestal 51. An azimuth drive rotates the tracking structure around a vertical axis 44 and an elevation drive pivots the concentrator and receiver around a horizontal axis 42. The center of gravity of the moving structure is ideally located where these axes intersect to minimize drive torque requirements. The concentrator frame 36 is mounted on one end of the main support structure 32, with the receiver 48 mounted on the other end. Assemblies of mirror facets 37 are attached to the concentrator frame 36. To stow the collector 30, the concentrator assembly 35 rotates up until it is partially inverted and the receiver 48 moves down to a limit set by interference between the single pedestal 51 and the main support structure 32. Both the azimuth and elevation drives that interface with the top of the central pedestal 51 are compact which requires an assembly with extraordinary strength and precision.

FIG. 4 shows a point focus solar collector mounted on a turntable 60 that has a central hub 38. The large diameter turntable structural member rides on rollers on top of many columns 61 which prevents snow and ice from interfering with operation. Wrapping a roller chain around the outside diameter of this turntable allows a stationary gear motor with a sprocket to effectively drive this solar collector system 30 around the vertical axis 44. Uplift is prevented by capturing the central hub 38 on the central column or providing uplift prevention devices on the column and roller assemblies 61. Two symmetrical main support structures 32 are each topped by bearings for suspending the concentrator frame 36 on the horizontal axis 42. A large diameter elevation drive support arc 55 allows a gear motor with a sprocket and chain arrangement similar to the azimuth drive with similar advantage. More than 180 degrees of motion with the concentrator assembly 35 facing past straight up to directly down is possible by simply extending the elevation support arc 55. Setting the shafts/bearings on the horizontal axis 42 so that the receiver 48 balances the concentrator assembly 35 minimizes loading and elevation drive power required.

Most two axis trackers for photovoltaic panels, heliostats and point focus solar collectors use a single pedestal. Although this lone foundation and column are simple, interface modules that mount on the top of the pedestal require dedicated castings or complex welded assemblies. These assemblies have to transmit large dead and live (wind) loads from the tracking structure to the pedestal and maintain tracking accuracy of the drives and bearings for decades. Thousands of pounds of wind acting on the wide sail area of the concentrator, say with a 36 foot diameter, is typically counteracted by a gear with a small radius, typically less than a foot, requiring precise (to minimize free motion) and very strong gear teeth. To replace these primary drive components and associated bearings typically requires removing the entire assembly from the pedestal. These issues limit single pedestal designs to around 800 square feet of active area.

To avoid concentrating forces through the small interface on top of a single pedestal, a variety of related art solar collectors use turntables that distribute support to multiple foundations. Turntables which do not use spokes would be quite small (concentrators less than 200 square feet) because the rings required for transmitting the wind forces involved in larger concentrators would be too heavy. Turntables which use spokes (supporting concentrators up to 5,400 square feet) are limited by the requirements to prevent uplift. If uplift (or overturning) forces are transmitted through the hub, very large forces are involved unless the length of the moment arm (the radius of the turntable ring) is also large which adds considerable weight to these assemblies. To prevent uplift through the connections between the turntable ring and multiple foundations for the rollers that support the ring and allow for rotation require accurately assembled mechanisms to capture the ring under all conditions.

Heliostats, solar furnaces, and point-focus solar collector systems utilize concentrators consisting of either a single monolithic reflector, one made of a parabolic array of mirrors or a Fresnel arrangement of mirrors. These systems follow the apparent daily and seasonal movement of the sun by two separate motions. Reflectors of both heliostats and solar furnaces direct sunlight to a stationary focal region. In a point focus solar collector system, the receiver typically moves along with the reflector. Point-focusing dish solar concentrators provide much higher optical and operating performance than any other type and have high temperature capability (3,000 degrees Fahrenheit and above), use minimal land, and are highly modular (power plant sizes from single kilowatts to many megawatts). Accordingly, such dish concentrator systems are very versatile and are adaptable to many markets for solar applications, particularly for generating electric power in both remote and community-scale installations, as well as providing industrial process heat, producing high value chemicals, making renewable fuels (hydrogen), and destroying toxic wastes.

Foundations, mechanical, electric, instrumentation, and communication interfaces and the tracking modules of point-focusing solar collector systems with related installation and quality control labor account for a large part of the construction effort. Because these subassemblies are similar for both large and small units, one can install a single large solar collector much more readily than many smaller ones. Structural issues begin to dominate this design approach for concentrators larger than 10,000 square feet, more than ten times the 800 square foot limit for single pedestals.

Accordingly, there remains a continuing need to improve solar collector systems for a wide range of commercial applications. Such solar radiation collector systems should:

be straightforward to manufacture, ship and install using common materials and indigenous facilities and not require expensive machinery or heavy equipment;

employ structures which are simple, strong, lightweight, and capable of supporting large concentrators and heavy receivers;

tolerate extreme weather conditions including severe winds, hail, freezing rain, snow, and the like without reducing performance;

allow ordinary people working together with hand tools to both manufacture and assemble models appropriate for harvesting and utilizing energy in their region; and have axes of rotation pass through the center of gravity so it takes very little power to follow the sun or stow the equipment.

SUMMARY OF THE INVENTION

A polar support configured for solar radiation collector systems or related systems having structural members connecting two or more columns that both support and anchor a gimbal carrying a solar concentrator, with or without a receiver. An equatorial support includes structural devices that allow the gimbal to both rotate and adjust the attitude for ease of assembly and establish the axis parallel to the earth's polar axis.

A drive device may be provided for imparting a desired rotational movement to the main support structure through a gimbal to effect a desired primary tracking motion to adjust for the apparent daily motion of the sun. The system can further include a drive device for moving the transducer elements to provide for a second adjustment for the apparent seasonal motion of the sun. When the transducer elements are reflecting or refracting elements, the system also may include a suitable receiver disposed at the point of focus for receiving the radiation. Direct energy conversion devices constitute their own receiver. For a solar collector system the receiver would be connected with the main support structure and would move with it on one or both axes, whereas for a solar furnace or a heliostat the receiver would be fixed at a desired location independent of the main support structure.

A solar radiation collector system can include a ground support, and a gimbal rotatably anchored at a first part of the ground support device to have a rotation orientation. The gimbal includes a gimbal rim mounted on the gimbal, which supports at least one radiation transducer element and a suspension member, connected to a second part of the ground support device, suspending the gimbal rim. A capture device connects to a driver and passes over the gimbal rim to rotate the gimbal rim and keep the gimbal rim in contact with the suspension member. The rotation orientation desired for tracking motion is adjusted for an apparent motion of the sun.

A method for assembling a solar radiation collector can include fixing a ground support on the ground, assembling a gimbal with a gimbal rim at one end of the gimbal, lifting the gimbal onto a second part of the ground support, redirecting the gimbal, so at least one part of the gimbal rim is close to the ground, assembling a transducer element on the gimbal rim, anchoring a bottom of the gimbal on a second part of the ground support, and adjusting a face of the transducer element so the transducer element can face the sun.

BRIEF DESCRIPTION OF THE DRAWINGS

The foregoing and other objects, features, and many of the attendant advantages of the present technology will become apparent and better understood upon reading the following detailed description considered in conjunction with the accompanying drawings wherein:

FIG. 6D is perspective View 6D shown in FIG. 6B that shows details of a gimbal orienting fixture that enables the equatorial end of the gimbal to be raised and lowered or fixed at an appropriate attitude in between.

DETAILED DESCRIPTION

Figure 1:
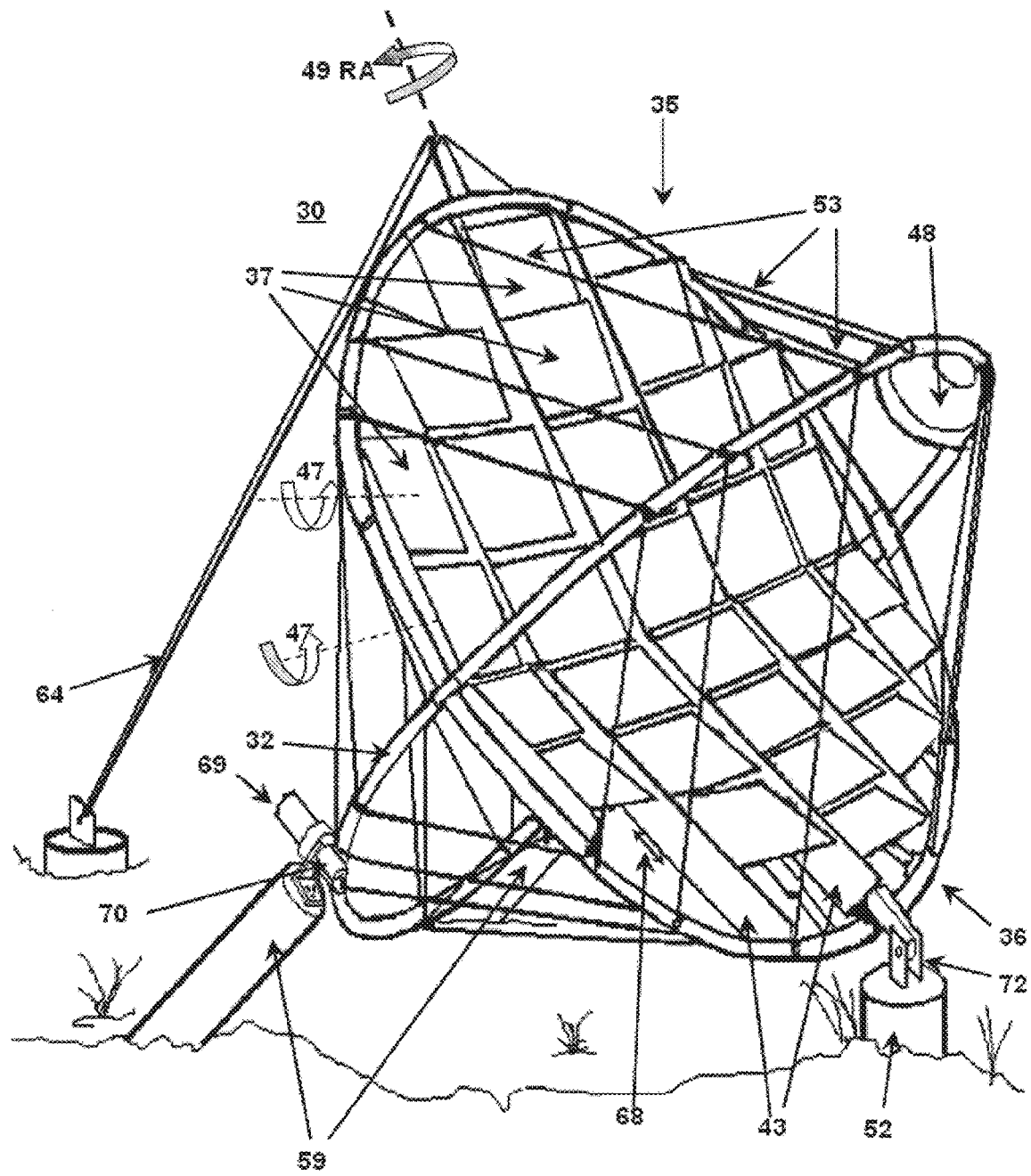
FIG. 1 is a perspective view of a related art two-axis tracking, solar collector system which follows the daily apparent movement of the sun by rotating the concentrator assembly in right ascension on an RA axis parallel to the axis of the earth, adjusts the declination angle of the concentrator elements to accommodate the other required motion and supports a curved rim on two polar support rollers.
Figure 2:
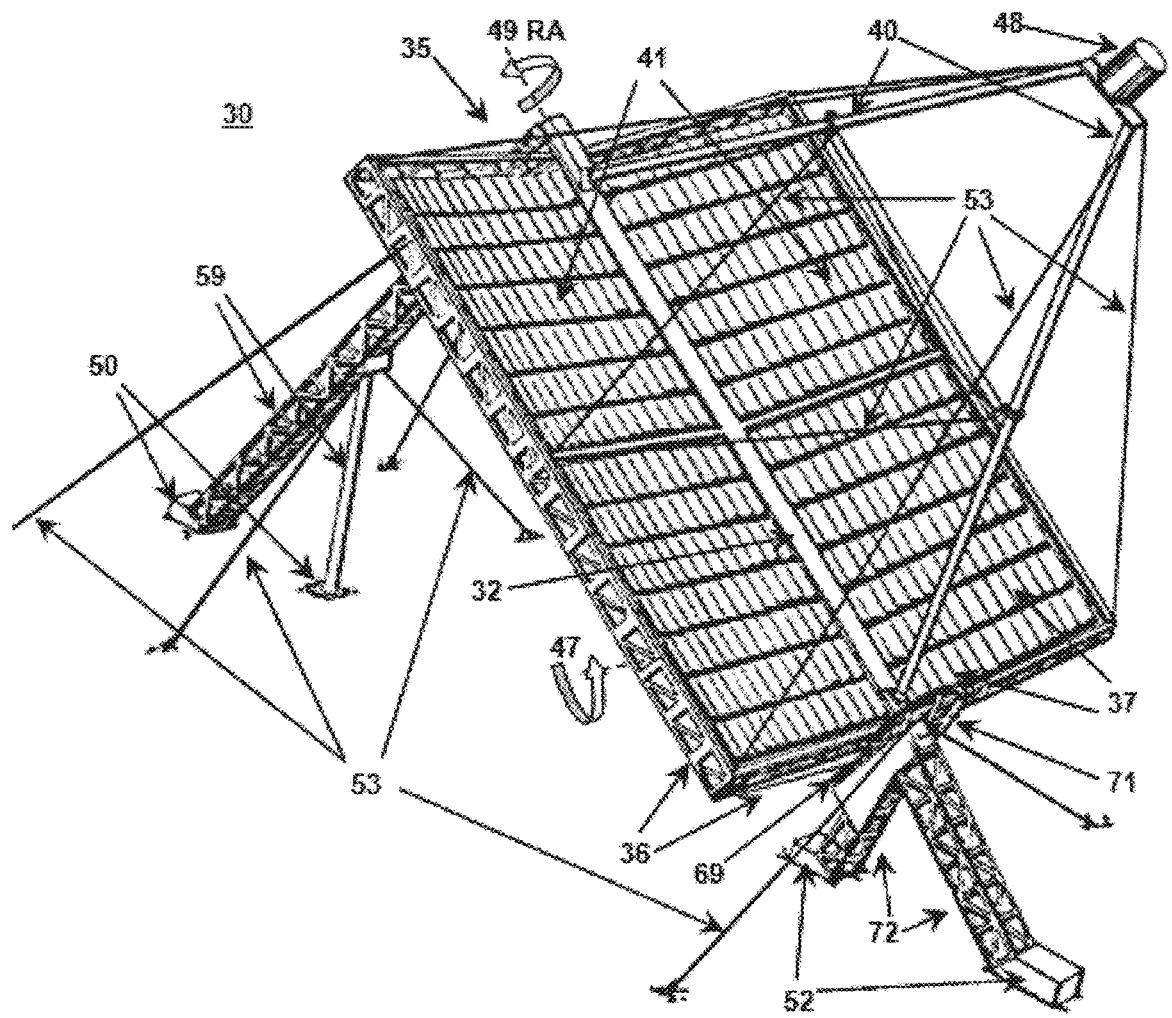
FIG. 2 is a perspective view of a related art two-axis tracking, solar collector system similar to the type described in FIG. 1 which supports the tracking structure between polar and equatorial columns and is driven in right ascension by a drive and wheel arrangement at the equatorial column, and rotates the 28 mirror assemblies to accommodate the second tracking motion.
Figure 3:
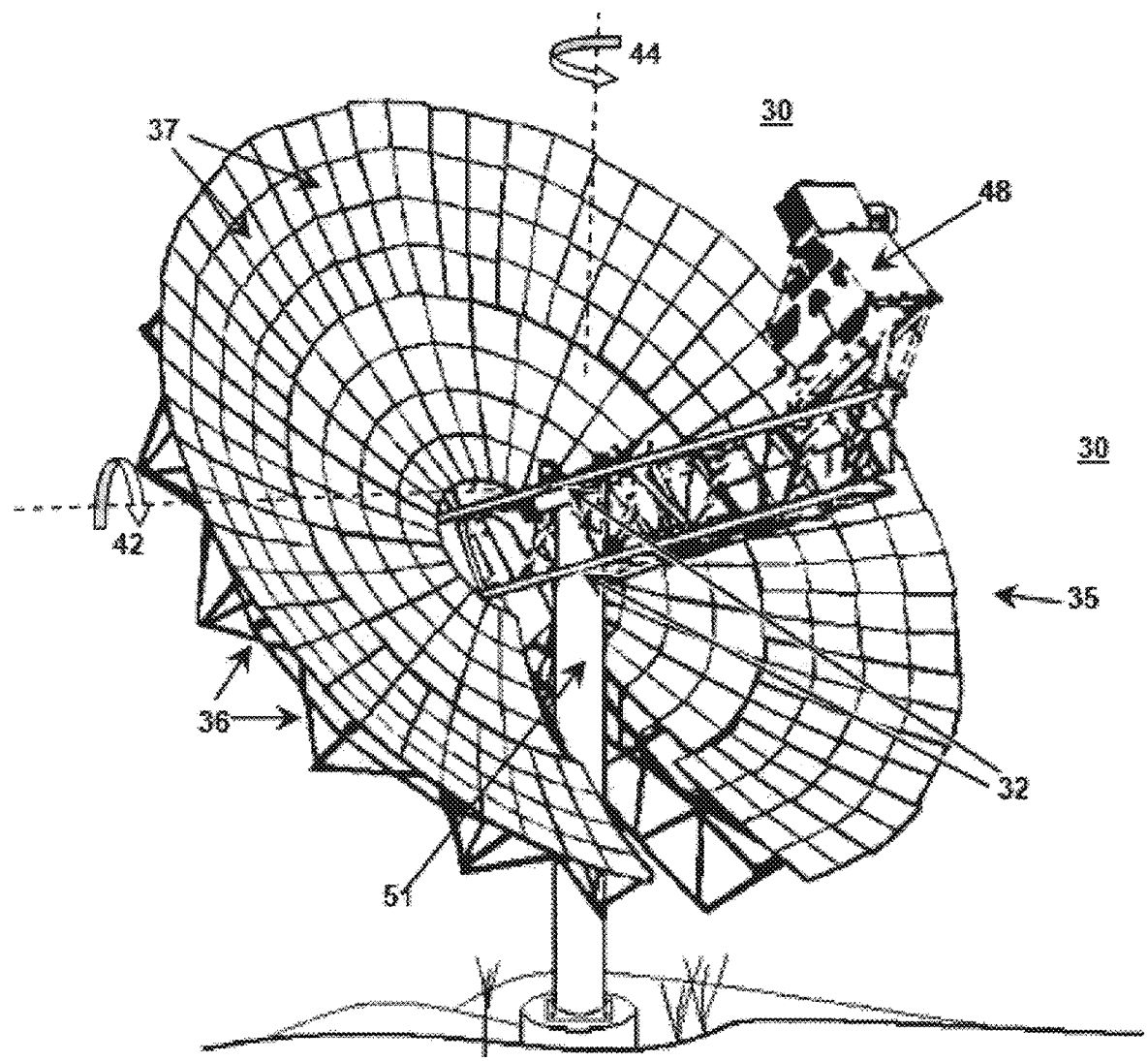
FIG. 3 is a perspective view of a related art two-axis tracking, solar collector system mounted on a single pedestal which follows the daily apparent movement of the sun by rotating the concentrator assembly in azimuth on a vertical axis, and pivots the concentrator assembly in elevation on a horizontal axis to accommodate the other required motion.

A support for tracking structures is simple, strong, lightweight, and capable of rigidly holding both large concentrators with heavy receivers and small solar collectors.

This technology may provide a simple, low power, rigid primary drive for accurately following the sun or other target in strong buffeting winds.

This technology may allow few widely spaced foundations with simple interfaces to both rotatably support and anchor the structure.

This technology may provide a tracking support structure which may be constructed from sets of readily fabricated pieces which are easily put together into compact subassemblies for shipping and then rapidly assembled at the site.

This technology may provide a way to elevate and lower tracking structures with common portable equipment so that construction personnel can assemble and repair components near ground level and elevate the structure safely, by hand, for operation.

While this technology is applicable to a wide range of electromagnetic radiation collector systems and to other systems which require precise single or two-axis tracking for an assembly, it is especially appropriate for solar radiation collector systems, solar furnaces, and heliostats and will be described for these embodiments.

Also, the technology will be described in detail as being equatorially oriented, with the right ascension, RA, axis parallel to the axis of the earth, however, it is to be understood that this is merely for convenience and that the technology is not limited to this particular orientation since this construction can also function if the solar collector primary axis of rotation is at another angle. Moreover at equinox, the plane of the concentrator can be either generally perpendicular to the plane of the gimbal rim or disposed at some other angle. For example, at equinox, the concentrator frame and transducer elements carried thereby may be disposed at an angle that averages between 40 to 50 degrees with respect to the axis of rotation to permit the "fixed focus" operation of a solar furnace through the seasons as shown, for example, in FIGS. 10A and 10B. Latitude, season, time and its location relative to the tower determine the relationship between a heliostat concentrator, the central receiver and the sun.

Furthermore, the technology may employ gimbals to support tracking structures. Gimbals typically would have members that form a rim at one end in combination with a simple pivot at the other end. For some applications, e.g., FIGS. 10A and 10B, suspending the rim without the offset pivot may be appropriate. These rims, that may be polygonal or arcuate, are supported and anchored so that the gimbals are stable at all orientations and both the rim and pivot ends, when utilized, of the gimbals can be raised and lowered. For example, in a preferred embodiment, three foundations support the gimbal. The rim of the gimbal may be both supported by at least one suitable structural device and be anchored by a second similar structural device, and when using flexible members, one of these can also provide the primary horizon to horizon tracking motion. The main tracking support structure of this technology, in addition to being very strong and lightweight is capable of supporting large, heavy loads and distributing radial loads through the gimbal rim interface members directly to the ground at all orientations of the main support structure. This approach can be readily both manufactured and installed with common hand tools.

Multiple transducer elements may be carried by the concentrator frame passing through the gimbal rim and provide for a desired utilization of solar radiation. The combination of the concentrator frame and the transducer elements carried by such frame form a solar concentrator assembly. The transducer elements may be, for example, reflector or refractor type elements for directing the solar radiation to a suitable receiver or multiple receivers.

Alternatively, the transducer elements may be direct energy conversion devices, such as photovoltaic cells or the like. For use with conventional photovoltaic concepts, arrays of cells which utilize either natural sunlight or concentrating modules can be employed. The system may further include suitable ground support and stabilization devices for rotatably supporting the main gimbal from the ground with stabilization in three dimensions and allowing at least ninety degrees of rotation of the main support structure with respect to the ground. The support and stabilization devices may rotatably support and capture the rim on primarily one end of the gimbal and rotatably supports another point outside the plane of the rim or at opposing positions on the rim providing effective three-dimensional stability that distributes dead and live loads to suitably spaced foundations.

In describing directions in this document, the term equatorial will be used for "toward the equator" and polar will denote "toward a pole". When describing the tilt of an axis or location of solar collector foundations, these terms avoid having to reference whether a description is for the northern or southern hemisphere. Otherwise, the terms "north" and "south" when used in solar motion directions in the northern hemisphere would have to be changed to "south" and "north" in the southern hemisphere.

Although suspension, capture and drive techniques described in this application can be implemented using accurately formed rigid arcuate components such as rings, hoops and gears, the preferred embodiments use very strong, flexible structural members such as link chain, cable, and webbing. These members naturally take shapes required for performing mechanical duties without machining or preforming. They are also inexpensive and easy to transport. In properly designed systems, these flexible structural members are extremely strong, do not fatigue, do not require periodic lubrication, and evenly distribute loads among interfaces. This technology extends their use beyond where they have been proven in suspension bridges, cargo restraining systems, and in lifting equipment including hoists, elevators and cranes.

Figure 5:
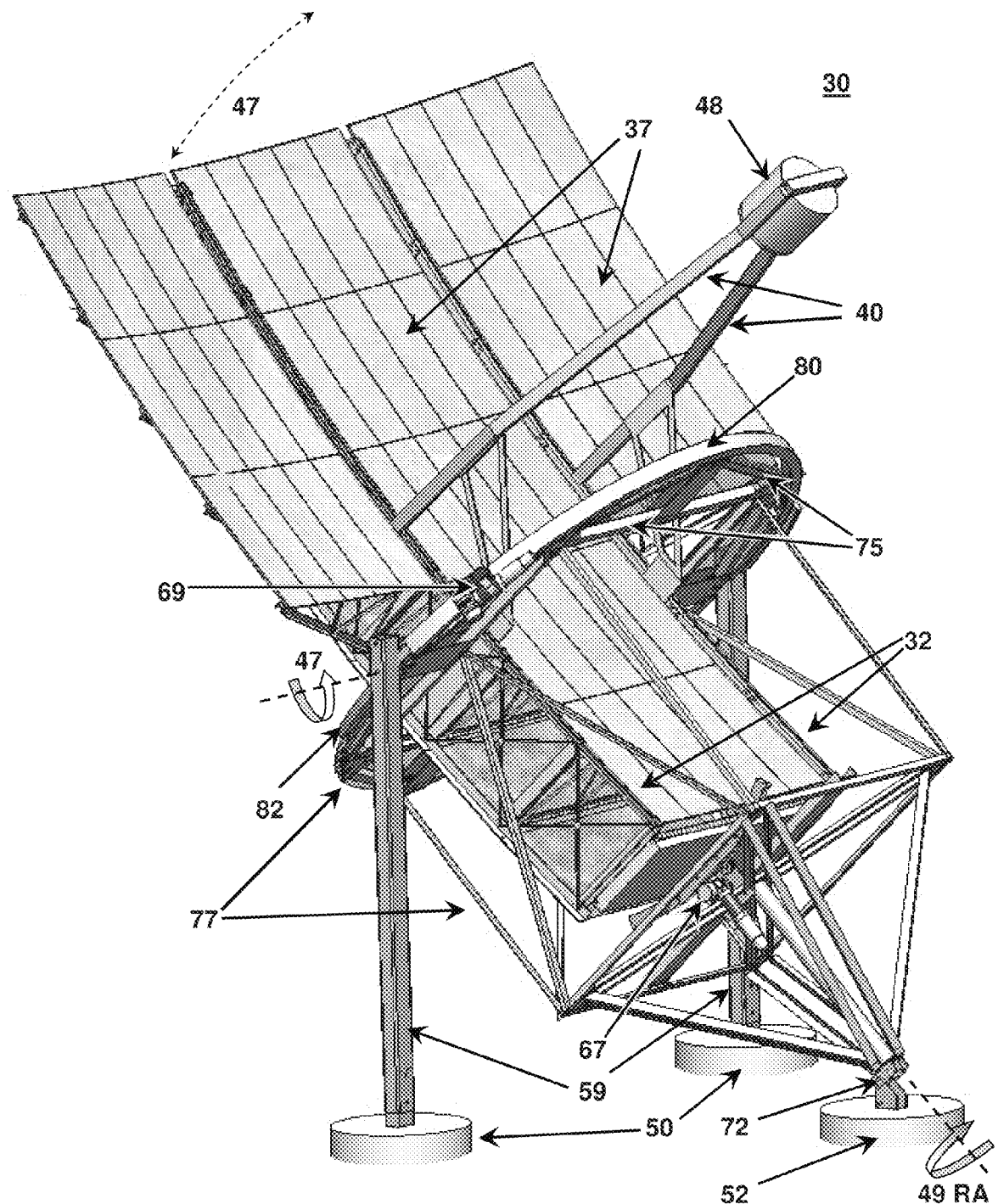
FIG. 5 is a perspective view of an embodiment of the solar collector system technology that includes a gimbal which rotates on an RA axis parallel to the axis of the earth, with the gimbal rim on one end suspended on a flexible member that ends in two collars attached to two polar columns and with the gimbal end opposite said rim rotatably mounted on an equatorial foundation.
Figure 6A:
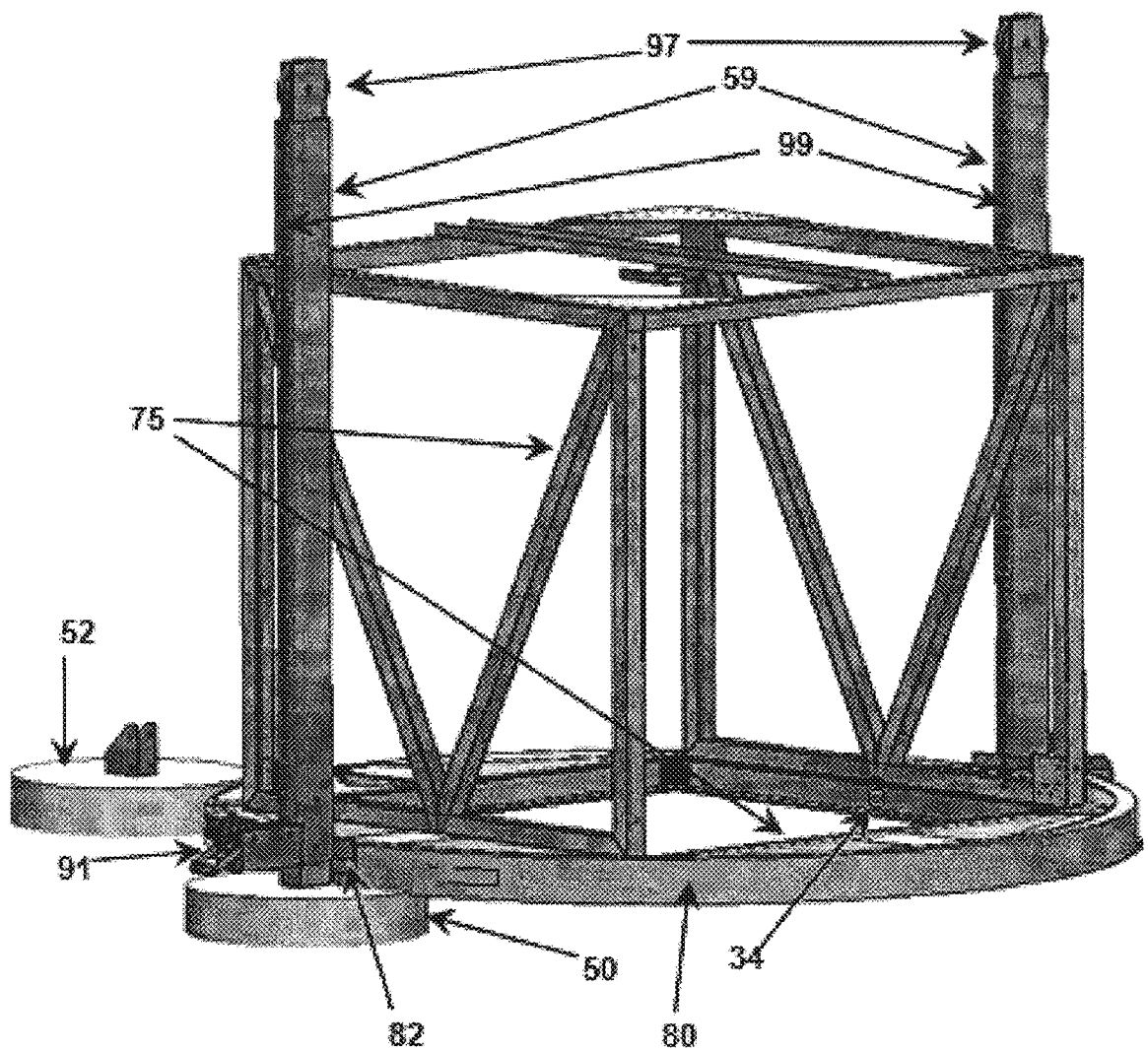
FIG. 6A is an early step in assembling the collector of FIG. 5 with the gimbal partially assembled and its polygonal rim close to the ground.
Figure 6B:
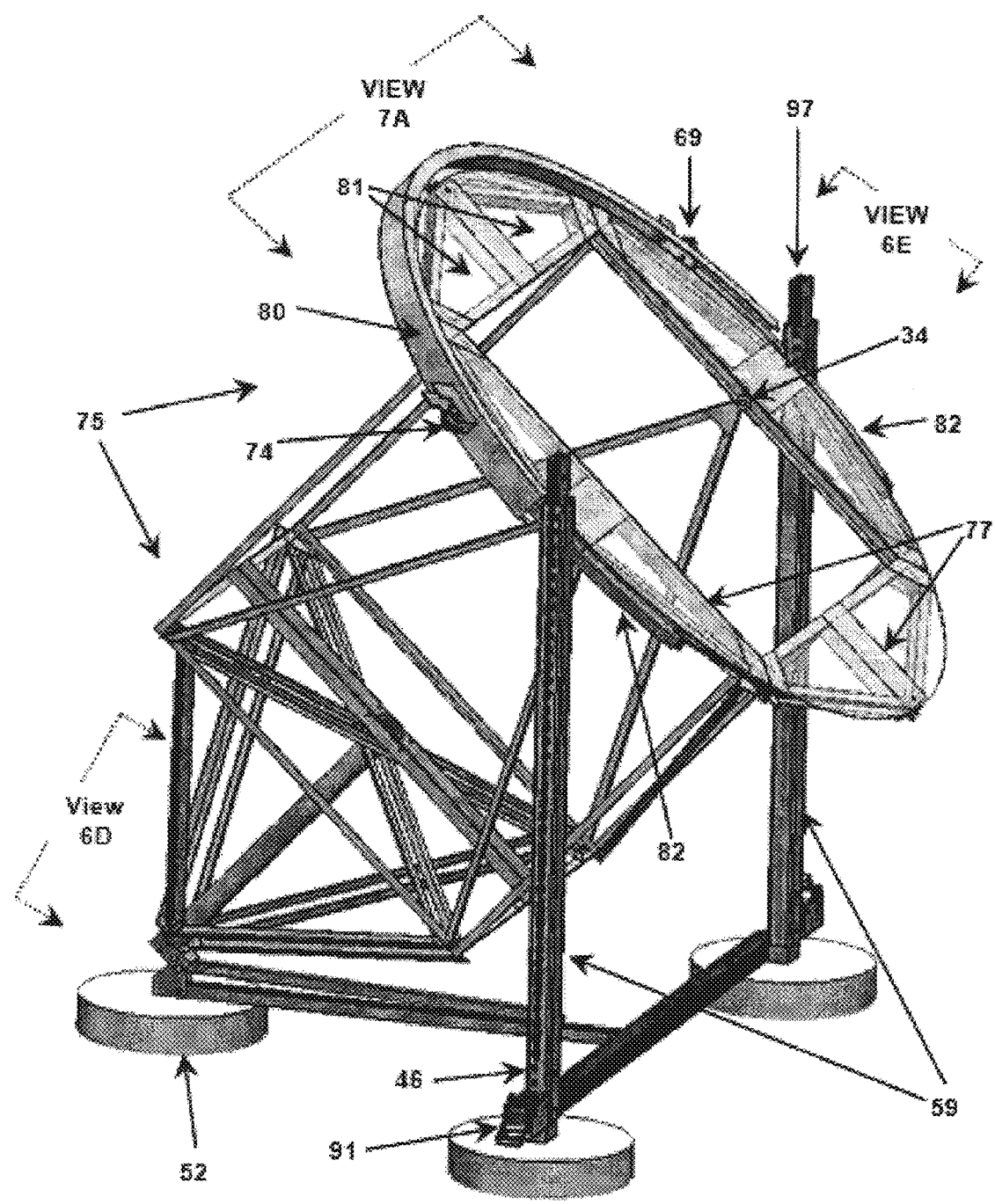
FIG. 6B is the next step in assembling the collector with the fully assembled gimbal oriented with the RA axis of rotation parallel to the axis of the earth.
Figure 6C:
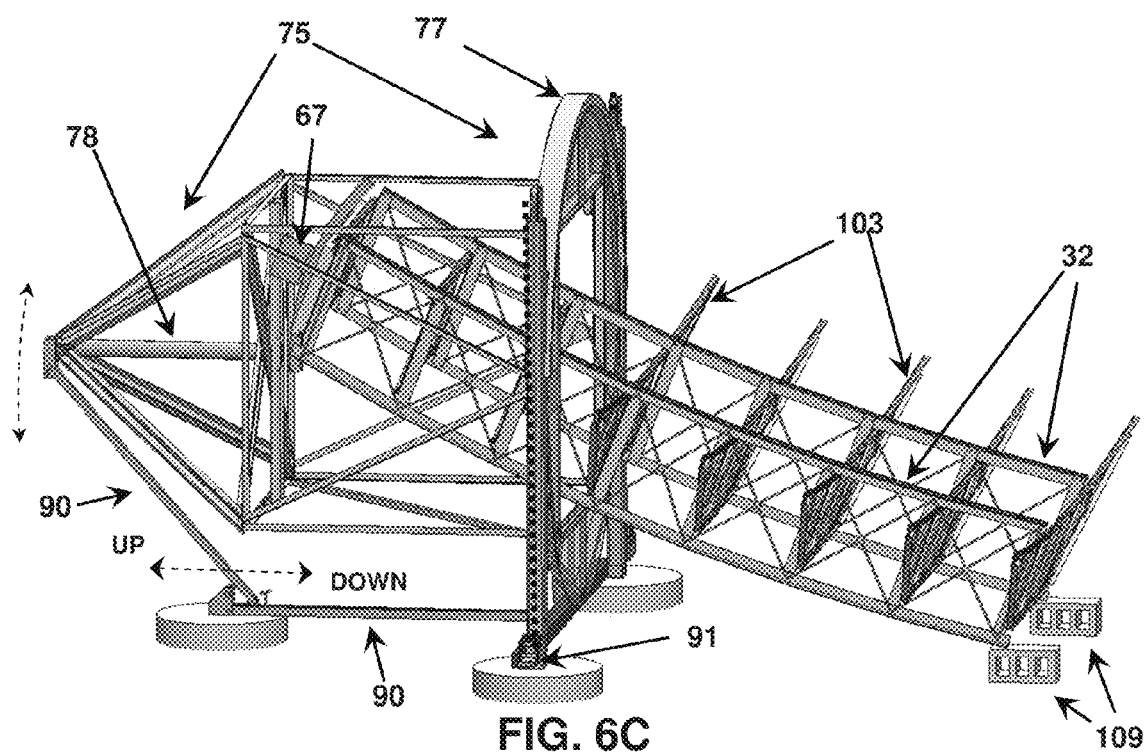
FIG. 6C illustrates another step in assembling the collector with the gimbal positioned for installing the main support structures and connecting the concentrator truss devices that establish the shape of the parabolic dish.
Figure 6D:
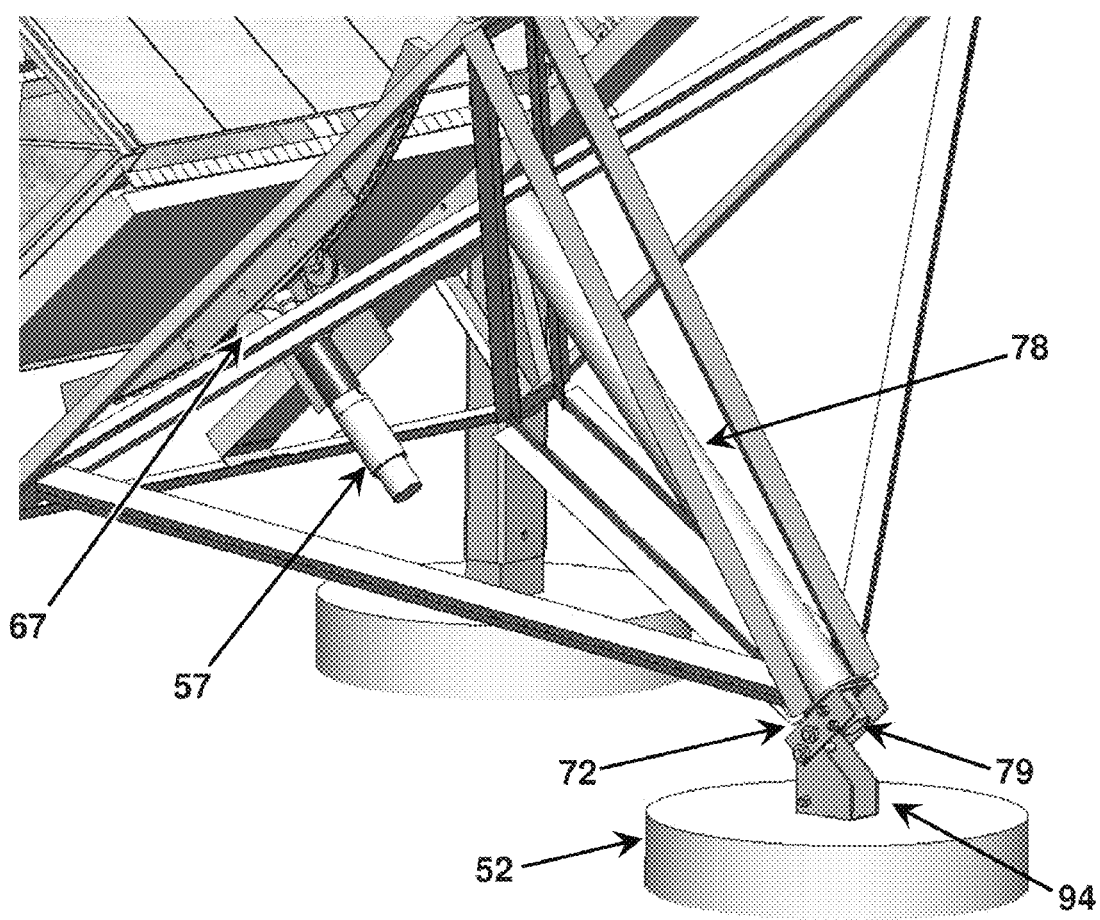
Figure 6E:
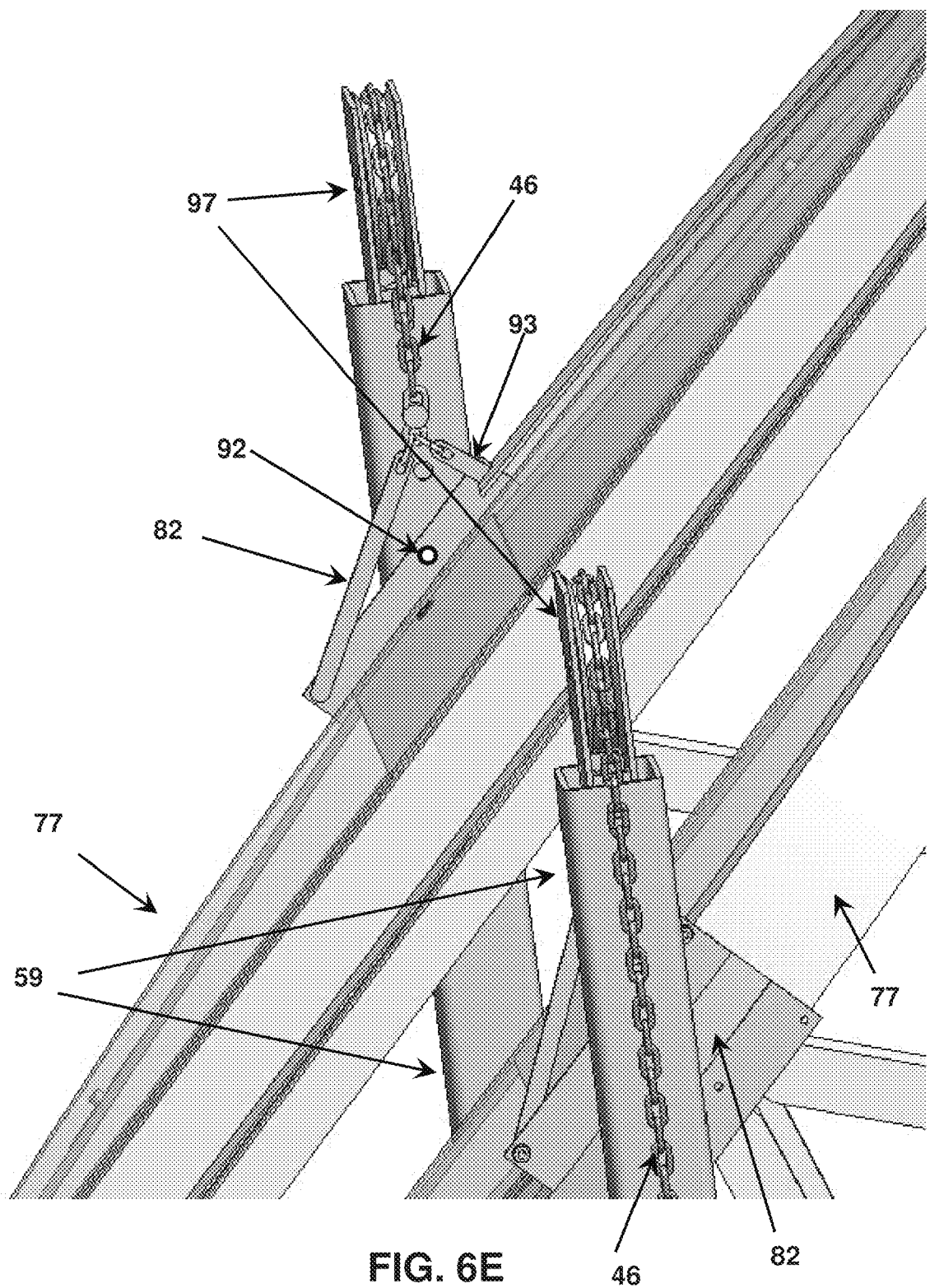
FIG. 6E is perspective View 6E shown in FIG. 6B that shows details of gimbal lifting devices with redirection mechanisms inserted into the tops of the polar columns and lifting members that raise and lower gimbal rim suspension collars that support and capture the rim of the gimbal.
Figure 6F:
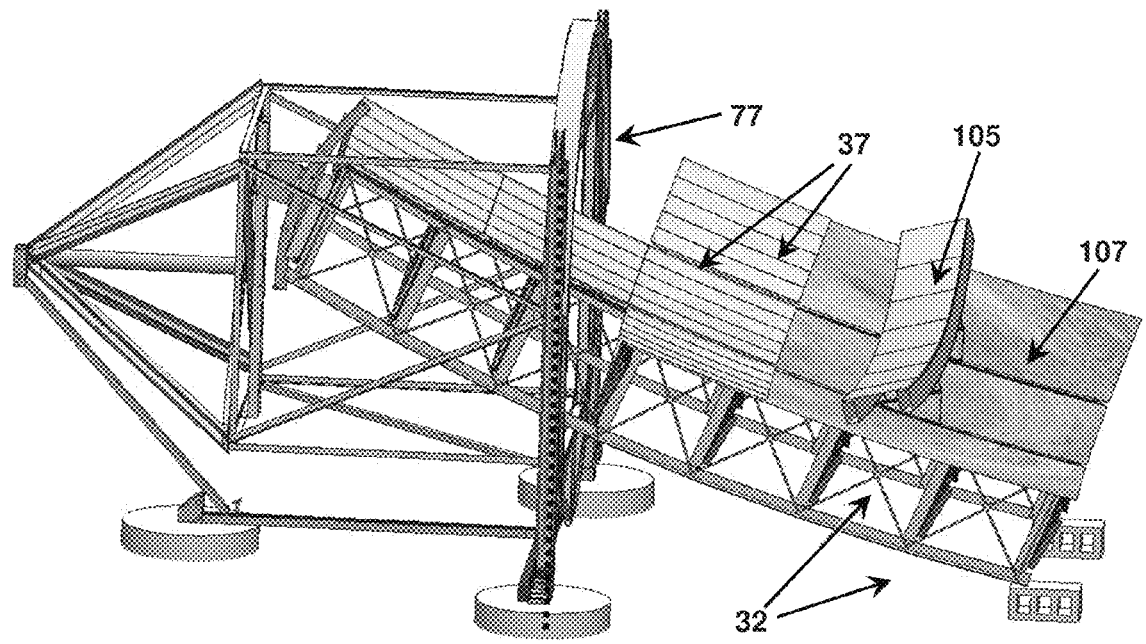
FIG. 6F is yet another step in assembling the collector installing the reflector support membranes and mirrors, utilizing a temporary platform that rides on the two main support structures.
Figure 6G:
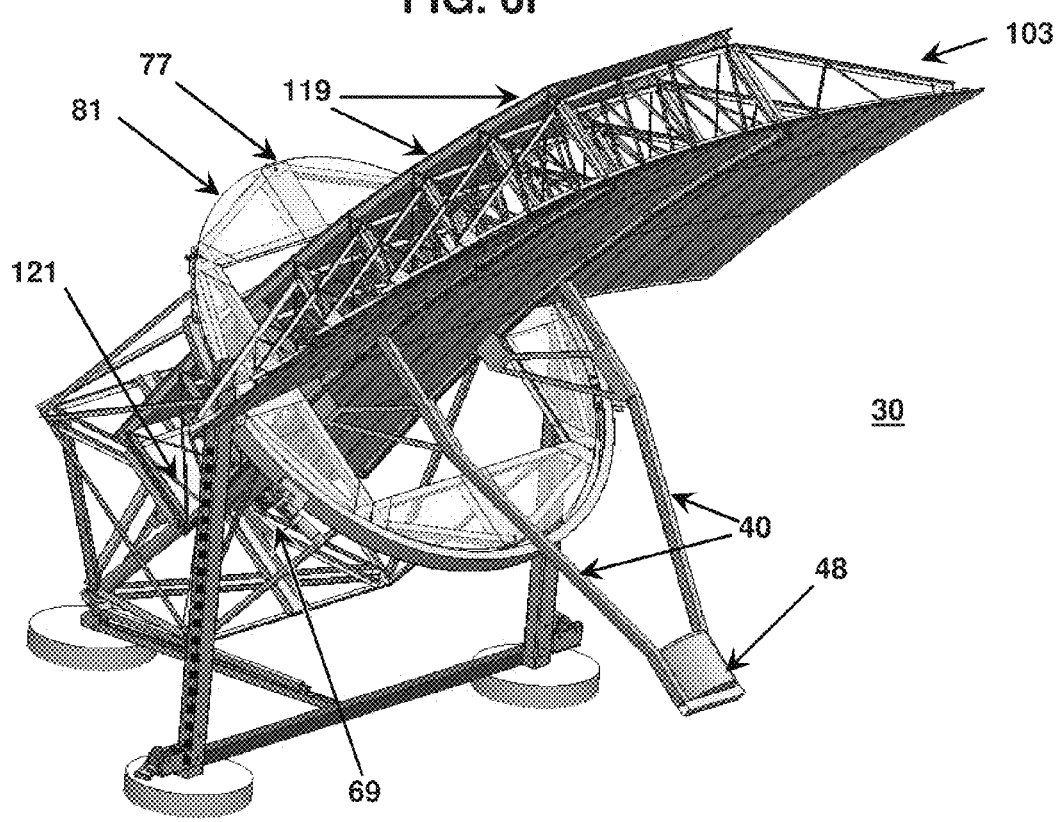
FIG. 6G is the final step in assembling the collector of FIG. 5 with the gimbal oriented so the concentrator structure faces the ground for mounting the receiver.
Figure 6H:
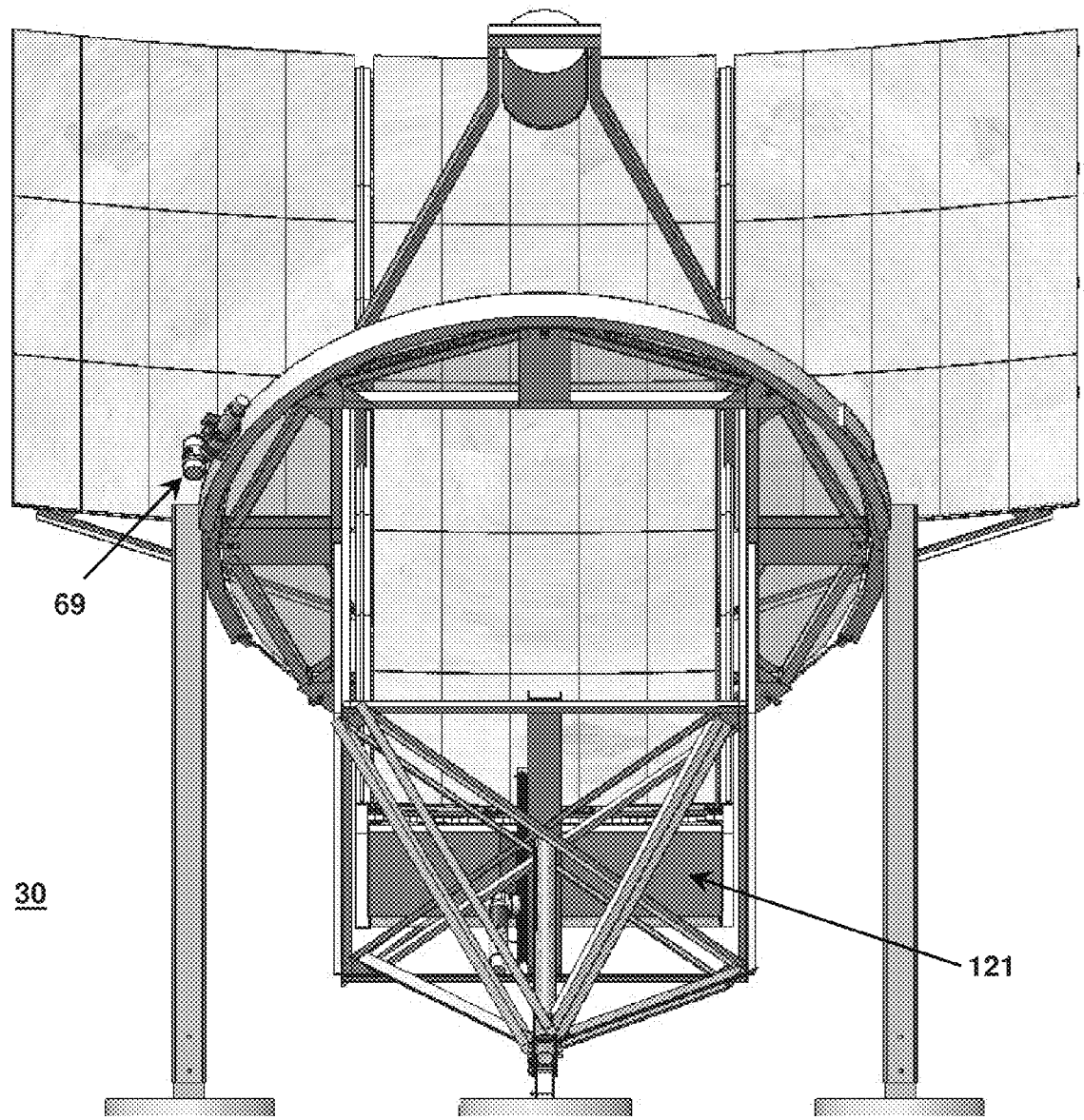
FIG. 6H is a front view of the completed solar collector showing the counterweight.
Figure 7A:
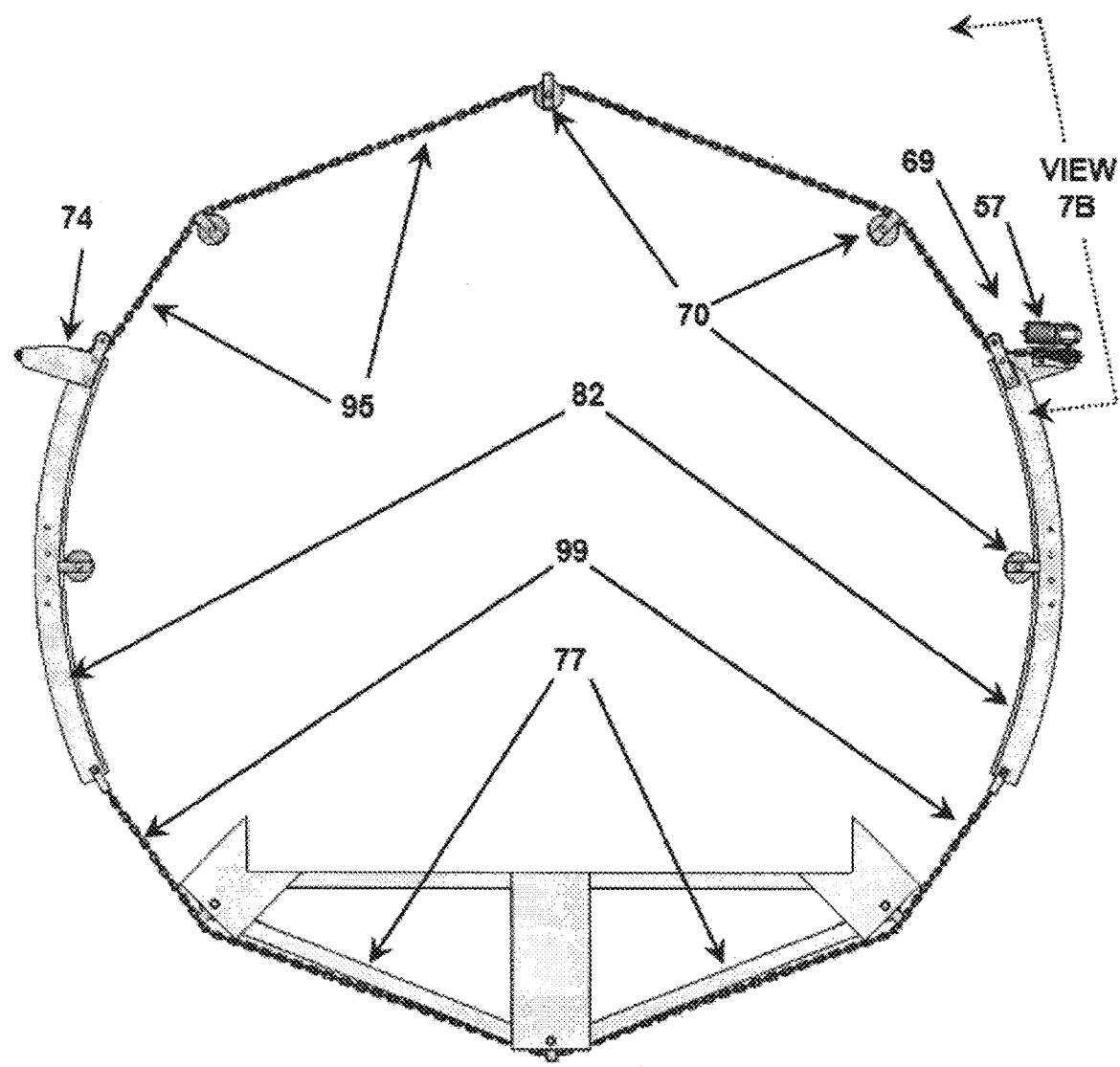
FIG. 7A is a section view 7A in FIG. 6B, that shows details of the suspension, capture and drive components that interface the polygonal rim of the gimbal, with only one quadrant of the polygonal gimbal rim visible, for clarity.

FIG. 5 shows a solar collector system 30 that includes a gimbal 75 that rotates on an RA axis 49 parallel to the axis of the earth, with the polygonal gimbal rim 77 on the gimbal upper end riding on suspension member 99 of FIG. 6, see FIG. 7A, suspended between two suspension collars 82 attached to two polar columns 59 and with the lower end of the gimbal 75 rotatably mounted at the equatorial foundation 52 utilizing an RA axis support 72. The RA drive 69 uses a flexible member to force the rim toward the suspension member 99 to prevent polar winds from lifting the assembly. The gimbal and foundation structures enable two workers with common tools such as winches, chain hoists, come-alongs and jacks to raise the solar collector system for operation and lower it for maintenance or to minimize exposure for class 5 hurricanes.

Figure 7B:
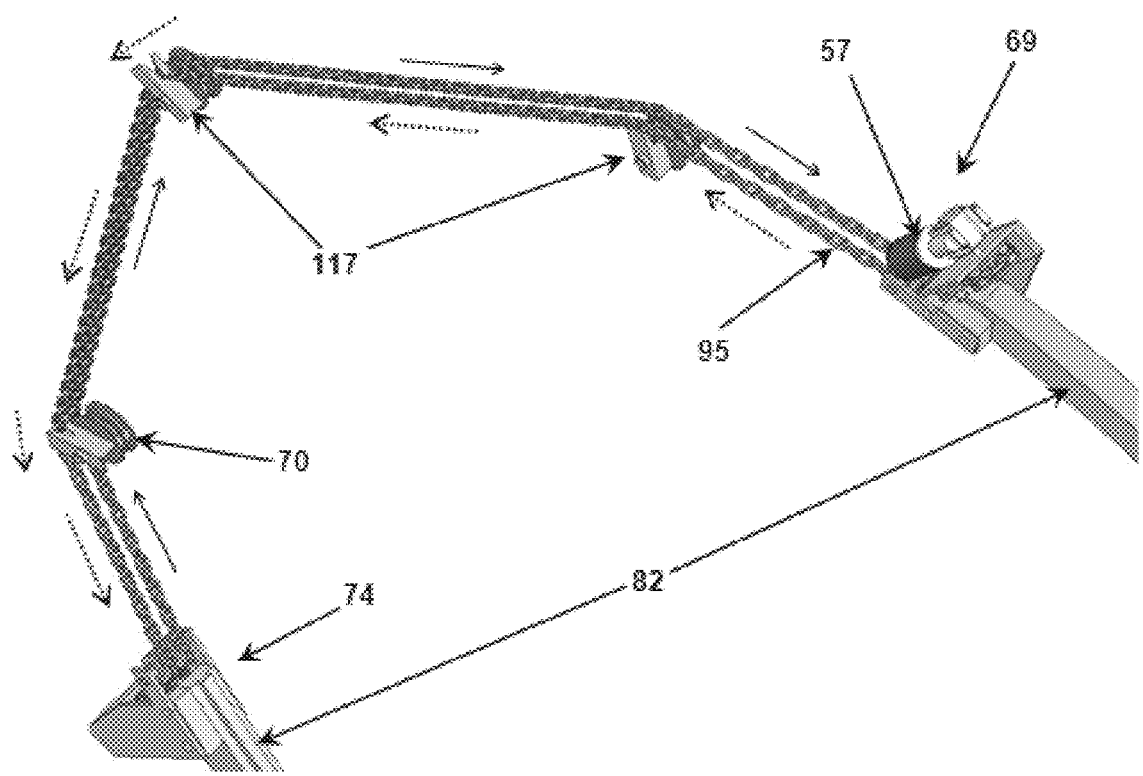
FIG. 7B is perspective view 7B in FIG. 7A, that shows the details shown in FIG. 7A from a different angle in a larger scale.

As described in FIG. 7A and FIG. 7B, a loop of link chain or cable provides capture device 95 by connecting the RA drive 69 on top of one gimbal rim suspension collar 82 and passing over the top of the gimbal rim 77 to the RA force transmitting redirection mechanism 74 on top of the gimbal rim suspension collar 82 on the opposite side. This loop is utilized by the RA drive to pull the gimbal 75, with the tracking solar collector 30, in either direction. Tension in this loop forces the gimbal rim 77 against suspension member 99 attached to the polar columns 59 through the gimbal rim suspension collars 82, see FIG. 9A, and insures that wind from a polar direction does not lift the gimbal 75. Pretension in the suspension/capture can most easily be introduced by incorporating a tensioning device that lengthens the loop path in the RA drive device redirection mechanism 74. The two gimbal rim suspension collars 82 also prevent the solar collector system 30 moving in high winds from the east or west.

The polygonal gimbal rim 77 in FIG. 5 and subsequent figures has eight sides which allow four gimbal rim rollers 70 on the lower half sharing support and those on the upper half capturing the gimbal rim 77, respectively. Larger solar collector systems 30 may require more gimbal rim rollers 70 resulting in the polygonal rim having 8, 12, 16, 20 or more sides and an equal number of gimbal rim rollers at the intersections of these sides. Also, the upper portion of the concentrator 35 and the concentrator truss devices 103 have been divided into three equal parts by two main support structure devices 32. This allows the concentrator truss devices 103 to be manufactured, packaged and shipped in equal length bundles. Equally valid for larger structures would be an approach that divides the upper portion of the concentrator 35 and the concentrator truss devices 103 into four equal parts with two symmetrical central portions between the two main support structure devices 32. This would establish a different relationship between the relevant dimensions of the gimbal 75 and the concentrator assembly 35 than illustrated in these figures that would be work in a similar manner. Also, these figures were created to clearly illustrate the construction details involved in building the gimbal 75 with polygonal gimbal rims 77 and associated concentrator assemblies. As shown, the portion of the gimbal rim 77 between the concentrator assembly 35 and receiver 48 would both shade some transducer elements 37 and block redirected sunlight reflecting off others from reaching the receiver 48. Techniques to minimize these effects are not emphasized in this work.

Common hand tools allow the gimbal 75, the concentrator assembly 35, receiver booms 40 and receiver assembly 48, illustrated and described under FIG. 6A through FIG. 6H, to be assembled near the ground and raised for operation or lowered either for maintenance or to minimize exposure to a category 5 hurricane.

FIG. 6A shows the first step in erecting a solar collector. Lifting redirection mechanisms 97 are inserted into the tops of two polar columns 59 mounted on the polar foundations 50. The gimbal polygonal rim 77 is assembled near the ground and gimbal rim rollers 70 inserted at each corner of the polygon, illustrated in FIG. 7A. Two gimbal rim suspension collars 82 are mounted on opposite sides of the gimbal rim 77 and suspension member 99 attached. The midsection of the gimbal 75 is erected on top of the gimbal rim 77. Lifting devices 91 are then used to lift the partially assembled gimbal high enough so that it can be turned toward the equatorial foundation 52. This figure also shows one of two support structure pivots 34 which engage corresponding components mounted on the two main support structure devices 32.

FIG. 6B illustrates the fully assembled gimbal 75 mounted between the two polar columns 59 and the equatorial foundation 52. In locations where freezing precipitation occurs, a gimbal rim radial cover 80 that is stationary and gimbal rim top face panels 81 that are attached and move with the gimbal rim 77 would protect the RA drive 69 and suspension member 99 shown in FIG. 7A from precipitation at all orientations. A second set of gimbal rim top face panels 81 can be attached on the bottom side of the gimbal rim 77 to prevent wasps and birds from entering this portion of the structure. At this point the attitude of the gimbal 75 is adjusted so that the axis of rotation is parallel to the axis of the earth by verifying that the angle between the gimbal axis outer tube 78 and a horizontal level is equal to the site latitude and that it lies over a line of longitude.

FIG. 6C has lifting devices 91 change the orientation of the gimbal 75 so that the two main support structures 32 that support the concentrator truss devices 103 can be inserted inside the gimbal rim 77. Main structure ground supports 109 may be placed to stabilize the two main support structures 32 while mounting concentrator assembly 35 and declination drive 67 components.

FIG. 6D is a close up view of the components associated with the RA axis support 72 and those used to control the gimbal's 75 orientation. The solar collector system 30 is designed to minimize the power required for the drives by locating the center of gravity of the assembled concentrator assembly 35 and receiver 48 on the centerline of the gimbal rim 77 shown in FIG. 6A as the support structure pivot 34. As a result, the gimbal rim 77 and polar columns 59 support the weight of the moving structure and the RA axis support 72 is lightly loaded so that it takes little effort to adjust the orientation of the assembly.

FIG. 6E is perspective View 6E shown in FIG. 6B that shows details used during construction of a gimbal lifting device that utilizes a flexible force transmitting device 46 with lifting redirection mechanisms 97 inserted into the tops of the polar columns 59. These are used in conjunction with lifting device 91, see FIG. 6B, to raise and lower gimbal rim suspension collars 82. Once a fastener through hole 92 connects a gimbal rim suspension collars 82 to the polar column 59, its lifting device 91, flexible force transmitting device 46 and lifting redirection mechanisms 97 can be removed and used for another installation.

FIG. 6F has the transducer support membrane 107 in place and three rows of transducer elements 37 mounted. A concentrator access platform 105 that rides on the top members of the two main support structures 32 during the construction phase can facilitate the assembly process. In addition to supporting the transducer elements 37, the transducer support membrane 107 provides diagonal bracing for the front face of the structure. One effective material for this function is corrugated metal or plastic because it is lightweight and the corrugations facilitate both their attachment to the concentrator truss devices 103 and the transducer elements 37 to the support membrane 107. Corrugations facilitate warping the material in three dimensions so that it establishes the required accurate paraboloidal surface for mounting reflective transducer elements 37. Straight plastic corrugated materials readily take the required curvature on site. Heavier metal corrugated materials may be formed with a radius of curvature that is the average radius of the concentrator parabola and then deformed during assembly to match the very slight difference required for the parabolic shape. PV panels can be fastened directly to straight concentrator truss devices 103 without utilizing a transducer support membrane 107.

FIG. 6G shows the collector system 30 reoriented so that it faces the ground to facilitate mounting the receiver booms 40 and receiver device 48. Also visible is the counterweight 121 added to balance the receiver device 48 and the concentrator components above the gimbal rim 77 that don't have corresponding items below the rim. Structural bracing devices 119 attached to the concentrator truss devices 103 on the side opposite the transducer support membrane 107 creates stiffness that effectively transmits torque from wind and gravity loads on the concentrator assembly 35 to the gimbal rim 77 and prevent twisting that would diminish the performances of the solar collector system 30.

FIG. 6H clearly shows the counterweight 121 in this view of the solar collector system 30 at solar noon.

FIG. 7A, perspective View 7A in FIG. 6B, shows, in section, details of the components that interface the polygonal rim 77 of the gimbal 75, with only one quadrant of the polygonal gimbal rim 77 visible, for clarity. This figure illustrates the arrangement of the components associated with suspension, capture and the preferred method of driving the polygonal gimbal rim 77. The weight of the tracking structure is borne by gimbal rim rollers 70 mounted at each junction of the polygonal rim 77 that ride on suspension member 99 shown as link chain. Each end of this chain is anchored to opposing gimbal rim suspension collars 82. During erection and maintenance these gimbal rim suspension collars 82 are suspended from the tops of the polar columns 59 as described under FIG. 6E. When assembly has been completed, the collars 82 are fastened directly to the polar columns 59. Since these collars engage the gimbal rim rollers 70 and limit motion to the east and west they should be longer than the distance between adjacent rollers so that they each engage at least one RA roller 70 on each side at all times.

The following are reasons for the preferred approach for mounting the RA drive 69 on the stationary gimbal rim suspension collars 82:
1. This system uses a shorter length of capture device 95 and its installation is straightforward;
2. The gear motor and associated components are always located at the same place where they are readily accessible and easily serviced;
3. The gimbal rim rollers are simple, each with a single interface that engages both the suspension member 99 while in the lower region, and the capture device 95 while in the upper region; and
4. This approach allows continuous rotation from east to west, without having to return in the opposite direction for installations where circuits and fluid lines do not restrict this mode of operation.

Reasons for incorporating the RA drive 69 with the gimbal rim 77 so that it moves with the tracking structure will be covered later.

The RA drive 69 powered by a gear motor 57 is mounted on one gimbal rim suspension collar 82 and a force transmitting member redirection mechanism 74 mounted on the other gimbal rim suspension collar 82. A loop of capture device 95, illustrated by link chain, passes over the top of the gimbal rim 77. One half of the loop circuit follows the same path on the gimbal rim rollers 70 as the suspension member 99. The other half of the link chain loop fits into force transmitting device engagement mechanisms 117 incorporated with each gimbal rim roller 70. This link chain loop is utilized by the RA drive 69 to pull the gimbal 75, with the tracking solar collector 30 attached, east or west. Tension in this chain forces the gimbal rim 77 against suspension member assembly 82/99 and insures that wind from a polar direction cannot lift the gimbal 75. Because tension in each half of the chain loop is equal, this doubles the preload force on the suspension member assembly 82/99.

FIG. 7B is perspective View 7B in FIG. 7A, that shows the details of the RA drive devices 69 shown in FIG. 7A from a different angle and in a larger scale. Both the force transmitting member redirection mechanism 74 and the RA drive 69 incorporate additional link chain rollers to insure that the gimbal rim rollers 70 make a smooth transition between the chain loop and the gimbal rim suspension collars 82, the profile of which should match the shape of chain as it rides on the gimbal rim rollers 70. The dotted arrows shown on FIG. 7B indicate that the force transmitting member engagement mechanisms 117 capture the appropriate half loop of the capture device 95 and the chain and the force transmitting member engagement mechanisms 117 move together when pulled by the RA drive 69. The other half of the loop travels in the opposite direction, shown by solid arrows, and rides on the gimbal rim rollers 70.

Figure 8A:
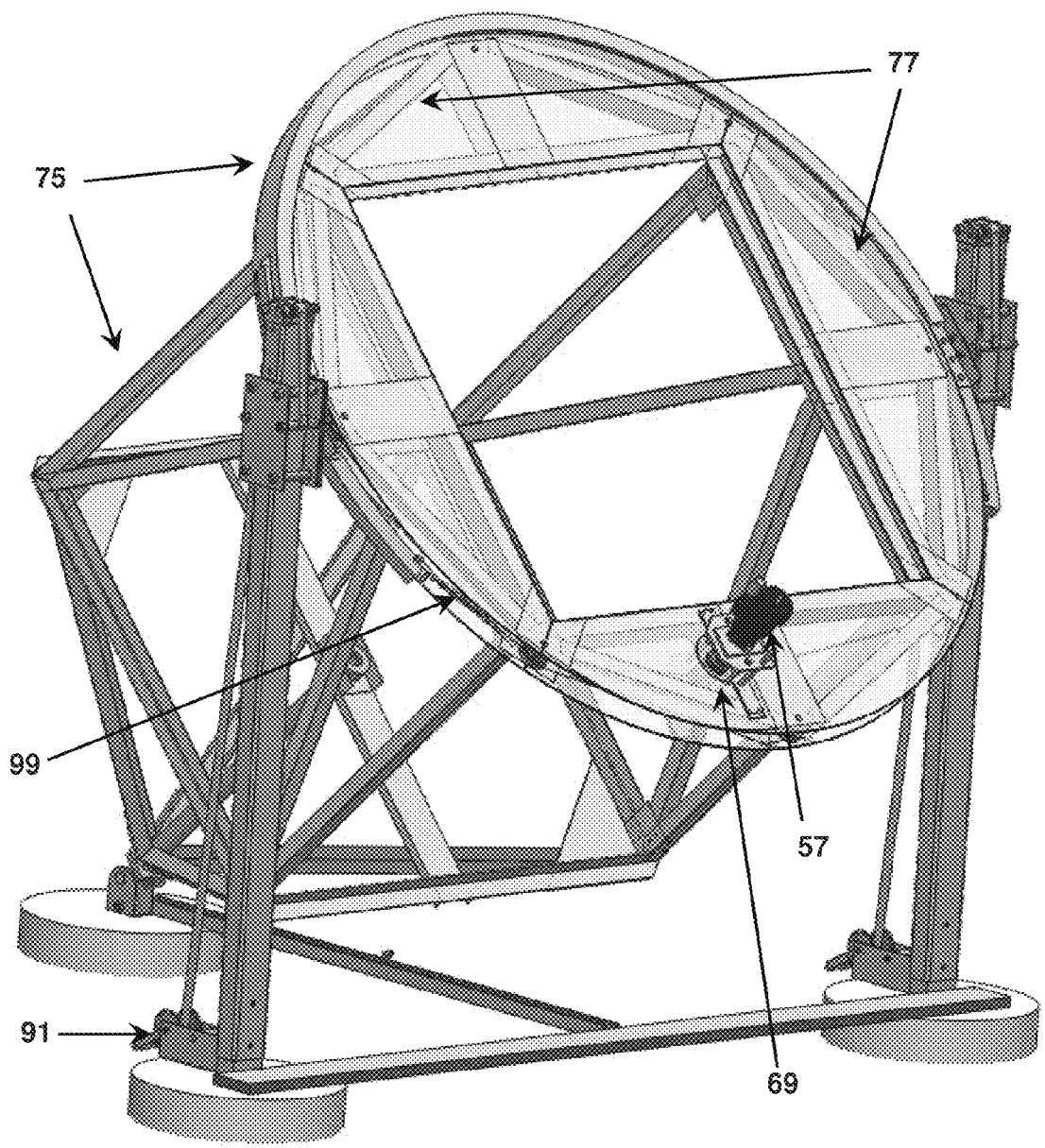
FIG. 8A is a view of an assembled gimbal oriented with the RA axis of rotation parallel to the axis of the earth that uses an RA drive integrated with the gimbal rim structure.

FIG. 8A is a view of an assembled gimbal oriented with the RA axis of rotation parallel to the axis of the earth that uses an RA drive 69 integrated with the polygonal gimbal rim 77 structure and also illustrates strap ratchets, another type of lifting device 91, cargo strapping, for raising and lowering the gimbal 75. Incorporating the RA drive 69 into the gimbal rim enables power and control cables to be short and within the "Faraday cage" of the moving structure.

In contrast to the RA drive 69 embodiment shown in FIGS. 7A and 7B where the gear motor 57 is mounted on a gimbal rim suspension collar 82 and does not move with the gimbal 75, the two RA drives 69 illustrated in FIG. 8A through FIG. 8F are mounted within the gimbal rim 77 and move with the solar collector systems 30. Reasons for incorporating the RA drive 69 on the tracking structure are:
1. The simplest and most reliable source of power for operating a point focus solar collector 30 is a dedicated deep cycle battery charged by a sunlight power module, both located on the moving structure. Like power for starting vehicles, autonomous power in a solar collector insures that there is power available for stowing the system if communications fail, power required by either drive exceeds a set limit, or weather becomes severe. It is the most simple way and uses the least materials to collocate the battery with one drive or with the on board controller and to have short cables to the other drive and sensors.
2. Point focus solar collectors 30 work best in open areas where they can intercept sunlight an entire day without shading by trees or buildings. This also makes them susceptible to lightning. The metal structures: gimbal 75, the concentrator assembly 35 and receiver 48 with booms 40 form a Faraday cage that keeps static electricity on the outside. Substantial static charges do not build up internally so that electronic assemblies are easier to protect inside this cage than are wires coming from outside.
3. For an autonomous system, battery, PV charging panel, drive and sensor modules with short wiring harnesses can be quality tested together and quickly installed. Subsystems not located on the tracking structure typically require wiring and quality testing be done during construction.
4. Communications and control technologies now include optical fiber and wireless techniques that are very reliable in areas exposed to lightning. Solar systems that generate the power they need onboard require only a communication channel, ideally one that does not use copper conductors, which can be very reliable.

Figure 4:
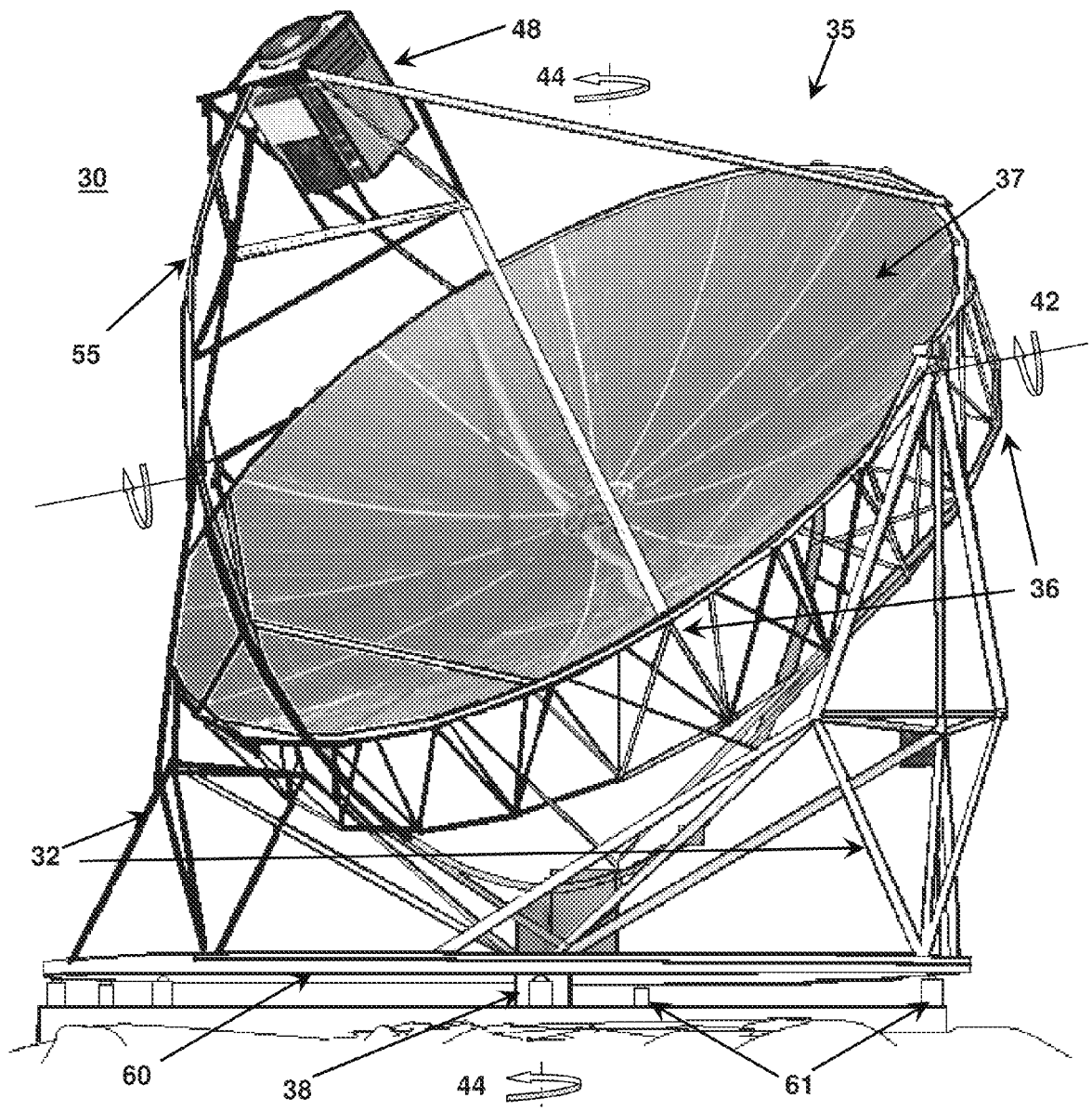
FIG. 4 is a perspective view of a related art two-axis tracking, solar radiation collector system that follows the daily apparent movement of the sun by rotating a turntable in azimuth around a central vertical axis, and pivots the concentrator assembly on an elevated horizontal axis between two structures to accommodate elevation motion.
Figure 8B:
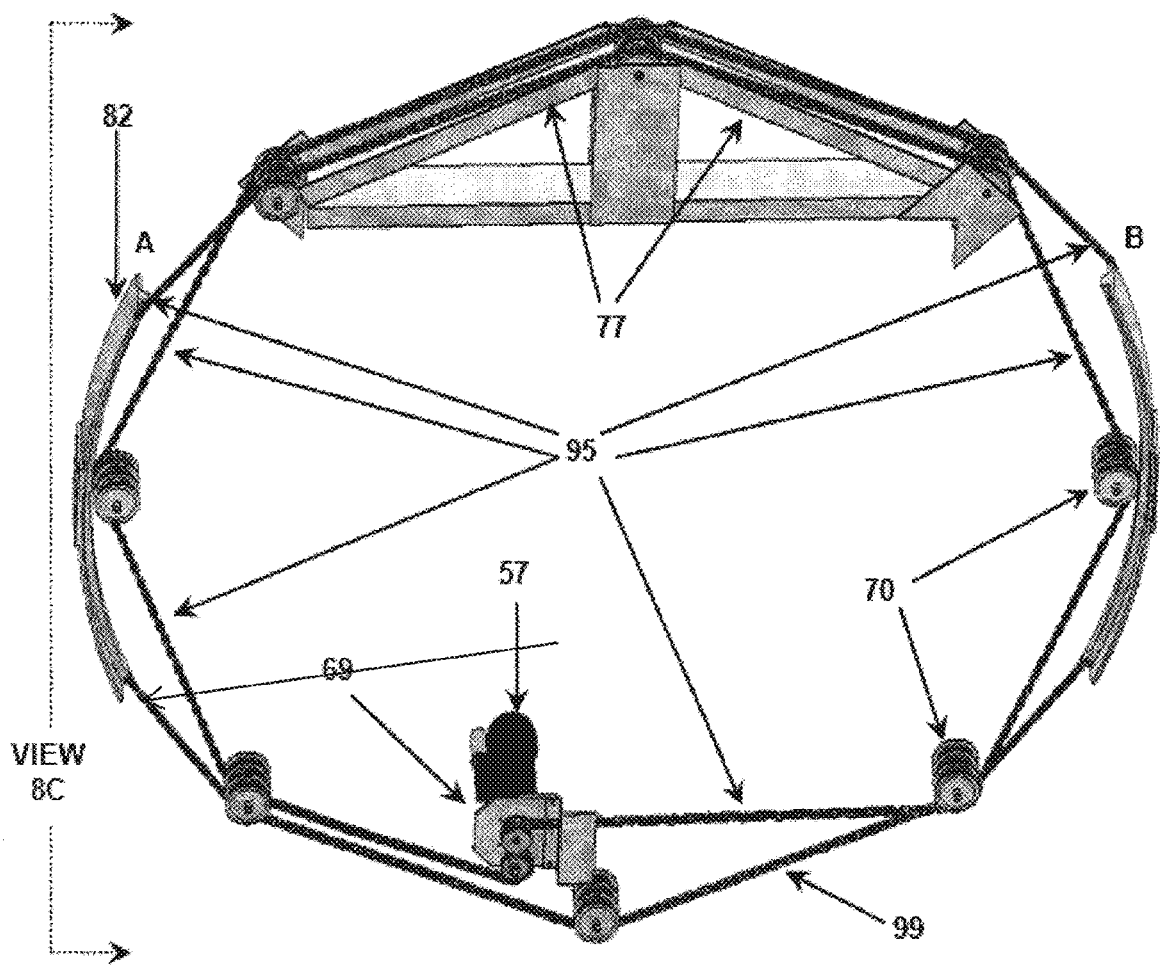
FIG. 8B shows, in a perspective view of the gimbal rim, routing of the flexible device used to both move and capture the gimbal rim, an associated right ascension drive mechanism, the two gimbal rim suspension collars, and the flexible suspension device, with one quadrant of the polygonal gimbal rim visible, for clarity.

The preferred version of this technology utilizes an RA drive 69 that is stationary, by attaching it to a gimbal rim suspension collar 82 fastened to one of the polar columns 59. Many turntable type solar collectors, illustrated in FIG. 4, utilize a sprocket on the shaft of a gear motor 57 to drive roller chain attached to a large diameter ring. This technique can readily be used for driving the gimbal rim 77 but roller chains require lubrication which can be problematic, especially in desert regions with a lot of abrasive dust. FIGS. 8A and 8B show an approach that uses a loop of link chain, that does not require lubrication, to drive the gimbal rim 77 and provide the capture device 95 pretension load. The solar collector gravity load and said pretension load is carried by the suspension member 99.

FIG. 8B shows, in a plan view of the polygonal gimbal rim device 77 of FIG. 8A, routing of the flexible capture device 95 used to both move and capture the gimbal rim, an associated right ascension drive mechanism 69, the two gimbal rim suspension collars 82, and suspension member 99, with one quadrant of the polygonal gimbal rim 77 visible. Because the central region of the gimbal rim rollers 70 rides on the suspension member 99, and therefore not available for another flexible member, the gimbal rim rollers 70 must include two additional regions for interfacing the capture device 95. The capture device 95 is first fastened to a gimbal rim suspension collar 82 at A and wrapped around the inboard grooves of the gimbal rim rollers 70 and to the RA drive 69 located in one quadrant of the polygonal gimbal rim 77. The drive 69 transfers the capture device 95 to the groove.

The flexible suspension device 99 starts at the bottom of the left hand collar and extends to the bottom of the right hand collars. The flexible capture device 95 starts at A and goes >500° to B.

Figure 8C:
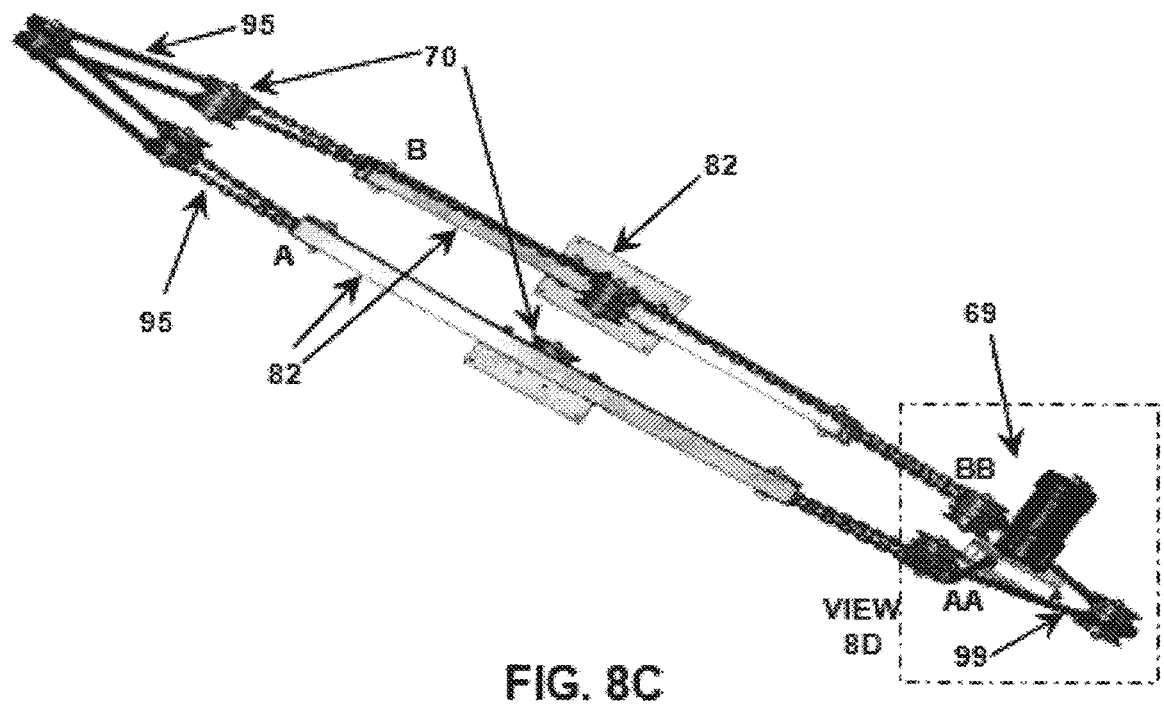
FIG. 8C is perspective view 8C of FIG. 8B that shows, in a side view, the items shown in FIG. 8B.
Figure 8D:
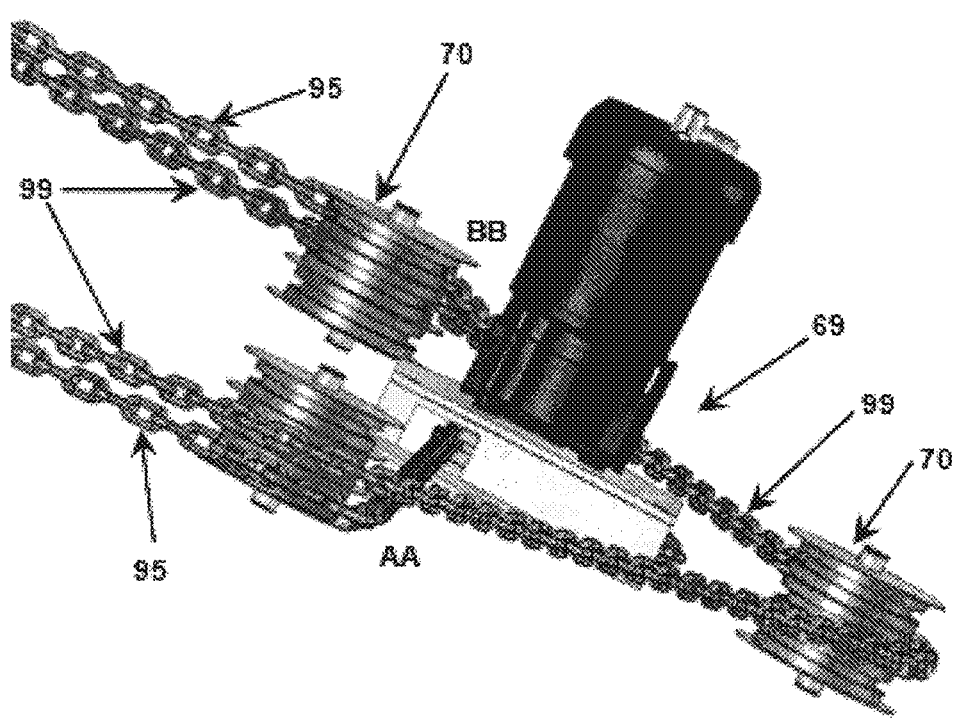
FIG. 8D is a close-up of the RA drive portion of FIG. 8C that shows that the RA drive transfers the flexible capture device from one side of a gimbal rim roller to the other.

FIG. 8D is a close-up of the RA drive portion outlined as View 8D of FIG. 8C that shows that the RA drive 69 transfers the flexible capture device 95 from one side of the gimbal rim roller 70 to the other and that the rim rollers 70 ride on the central groove of the suspension member 99.

Figure 8E:
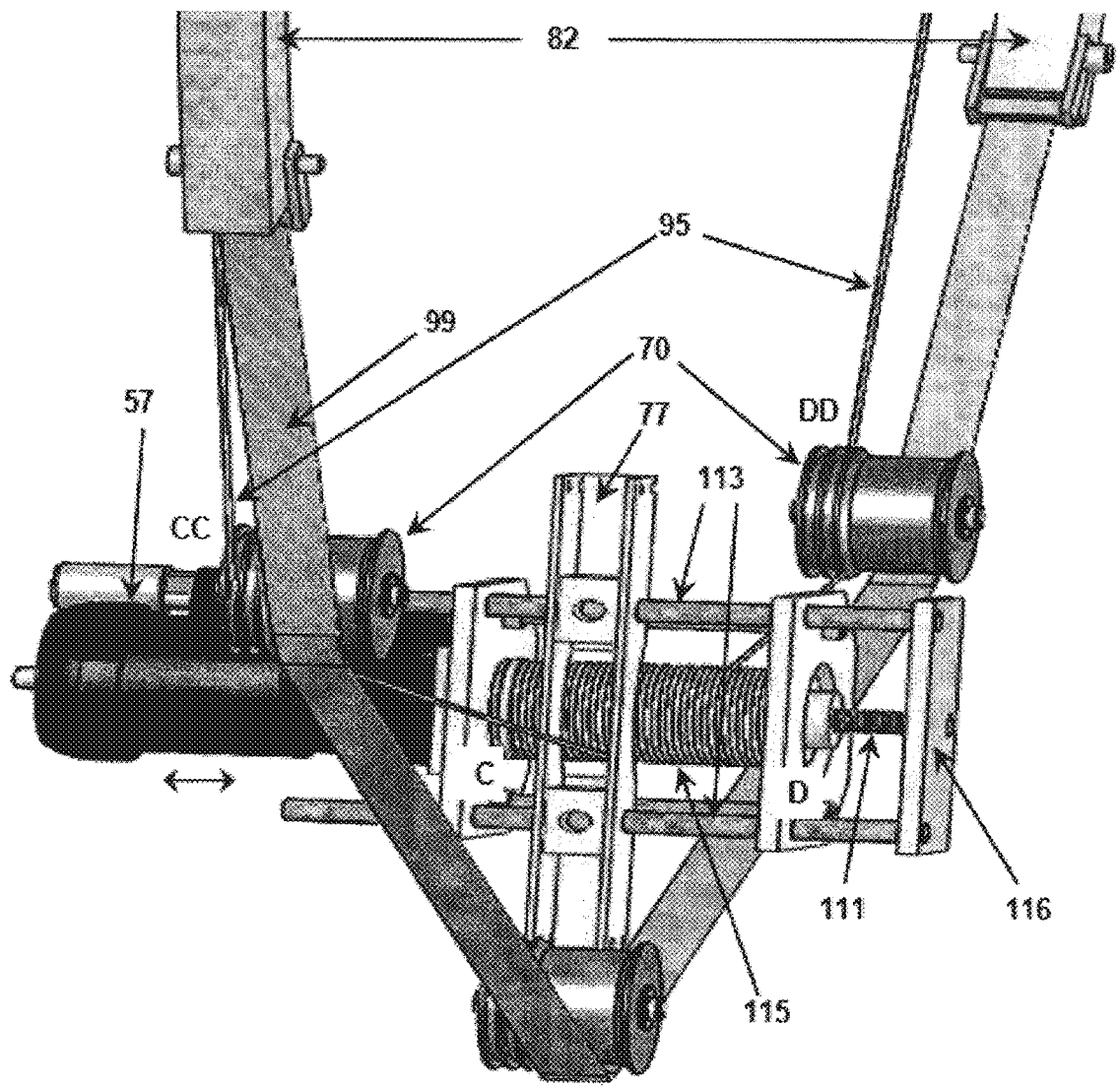
FIG. 8E is a close-up from the same perspective as FIG. 8D of another RA drive option that uses wire rope for the flexible capture device for both the primary motion and preventing uplift, and uses webbing for suspending the gimbal rim.

FIG. 8E is a close-up from similar perspective to FIG. 8D of another RA drive 69 option that uses wire rope, also referred to as aircraft cable, for the flexible capture device 95 for both the primary motion and to prevent wind uplift, and uses webbing for suspension member 99 of the polygonal gimbal rim 77. It illustrates the arrangement of the components associated with suspension, capture and driving the polygonal gimbal rim 77 using this method. The weight of the tracking structure is distributed through gimbal rim rollers 70 mounted at each junction of the polygonal rim 77 that ride on suspension member 99 shown as webbing. Each end of the webbing is anchored to opposing gimbal rim suspension collars 82. During erection and maintenance these gimbal rim suspension collars 82 are suspended from the tops of the polar columns 59 as described under FIG. 6E but in this application using webbing instead of link chain in the lifting devices 91. In a manner similar to that described for link chain under FIG. 7A, respective ends of two separate cables are fixed to each of the two gimbal rim suspension collars 82 and pass over the top of the gimbal rim 77 in opposite directions. They are utilized by the RA drive 69 to pull the gimbal 75, with the tracking solar collector attached 30, around the cable circuit. Tension in these cables insures that wind from a polar direction forces the gimbal rim 77 against suspension member 99 and does not lift the gimbal 75. Each cable is long enough to make one and a half circuits around the rim and is tensioned to the working limit of the cable. At solar noon when the concentrator assembly 35 is facing the zenith and the RA drive 69 is near the ground, an equal amount of cable is wrapped around the RA cable drum 115. The RA cable drum 115 has spiral grooves to accommodate a single layer of cable. The first cable is fixed to one end of the RA cable drum 115 and is wrapped, following the spiral grooves to the middle of the cable drum. The second cable is fixed to the other end of the RA cable drum 115 and wrapped in the opposite direction until it meets the other cable at the middle. As the RA cable drum 115 rotates counter-clockwise, it pays out the cable attached to the west gimbal rim suspension collar 82 and draws in the other so that the cable junction interface proceeds from the cable drum 115 center, at solar noon, to the upper end of the cable drum 115 at the east limit and the concentrator is facing toward the ground, as in FIG. 6F. Proceeding in the other direction from solar noon, the cable interface junction proceeds from the cable drum 115 center to the lower end of the cable drum 115 at the west limit and the concentrator again faces the ground. To prevent fatigue of wires within the cable, the RA cable drum 115 should be mounted so that the cables enter and leave on the same side of the RA cable drum 115 as they engage the gimbal rim rollers 70. When the gimbal rim rollers 70 are between points A and B in FIG. 8C they must accommodate two capture device 95 (but in this case cable) while in the balance of the circuit the rollers only engage a single cable.

For the same reason RA drive 69 described under FIG. 8B routs the link chain from one side of the gimbal rim roller 70 to the other, this flexible cable drive routs the capture device 95 from one groove to the one adjacent to it to prevent them from overlapping when the drive is between the upper ends of the gimbal rim suspension collars 82.

An escapement device is required in this type of drive to keep the cable interface location on the drum, where one cable winds off and the other winds on, in line between the left cable groove of gimbal rim roller 70 at CC and the right cable groove in corresponding roller at DD. To keep this cable interface junction on the RA cable drum 115 in line with the respective grooves in the adjacent gimbal rim roller 70, the RA drive components can be mounted on linear support devices 113 and the drive assembly moved left and right as one cable is wrapped on and the other spooled out. One way to accomplish this is to utilize static positioning devices 111 which has external threads with the same pitch as the spiral grooves for cable in the RA cable drum 115 along with a region with matching internal threads the drum axis. This static positioning devices 111 is firmly attached to the linear support devices 113 by a connector 116. As the RA cable drum 115 turns, it pulls itself to the right as it pulls the polygonal gimbal rim 77 to the east keeping the cable interface junction in line with the grooves in the two gimbal rim rollers 70. For 0.125 inch OD cable (with a 1,600 pound working load) with seven wraps per inch of drum, an Acme threaded rod with 7 threads per inch and a matching nut mounted on the axis of the drum works well for small systems. In a similar manner, when rotating in the other direction, clockwise, turning the solar collector system 30 westerly, the RA cable drum 115 counterclockwise (viewed from the right), it pushes itself and the attached gear motor 57 along the linear support devices 113 to the left as it winds on the cable attached to the west gimbal rim suspension collar 82.

Figure 9A:
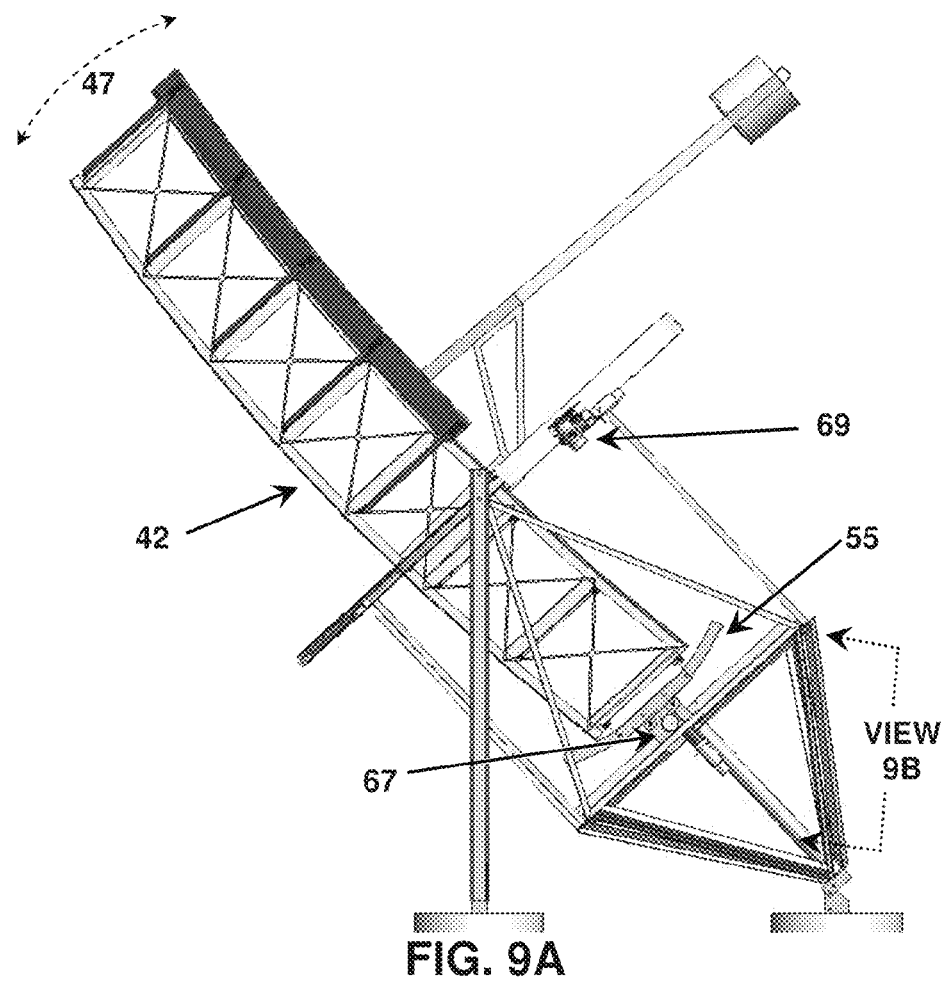
FIG. 9A is a side view of the collector shown in FIG. 5 showing one suitable arrangement for providing the second tracking motion: declination.

FIG. 9A, a side view of the collector shown in FIG. 5, shows in profile the preferred declination drive 67 that uses the same link chain technology and many of the same parts as the preferred RA drive 69 described under FIG. 7A and FIG. 7B. The declination drive 67 also utilizes link chain as a flexible force transmitting member 46, see FIG. 9B, to respective ends of a short length of drive support arc 55. An arc length of 50° of declination motion 47 accommodates doubling the tilt of the earth, 23.5° (from equinox to summer and winter solstices) and an additional 3° for tracking off sun when there is no call for power. This drive has to provide motion that accommodates the 23.5 degree tilt of the earth as it circles the sun. From equinox, the sun travels this much above the ecliptic to the summer solstice and below to the winter solstice. This motion also has to enable focused sunlight to align just above the receiver when energy is not required and therefore must cover a minimum of 50 degrees.

Any other suitable drive technology such as an electric linear drive, hydraulic or pneumatic cylinder, and a roller chain sprocket arrangement can also be utilized to accomplish this declination drive task. Also visible in this view is the counterweight 121, which can form a stiff integrating structural member between the two main support structures 32 for the declination drive to act upon.

Figure 9B:
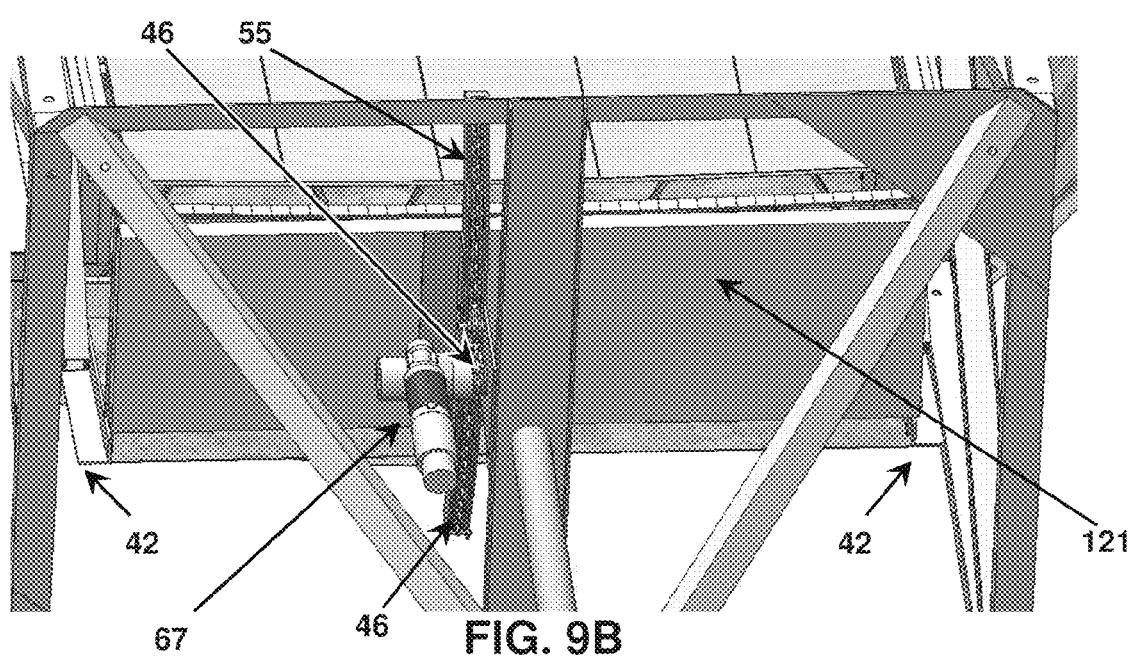
FIG. 9B is a close up view of the declination drive shown in FIG. 9A that uses link chain.

FIG. 9B shows a close up of View 9B in FIG. 9A of the declination drive 67 that uses link chain for a flexible force transmitting member 46. This view also clearly shows the counterweight 121 that allows the center of gravity of the moving system to coincide with the RA and declination axes of rotation.

Figure 10A:
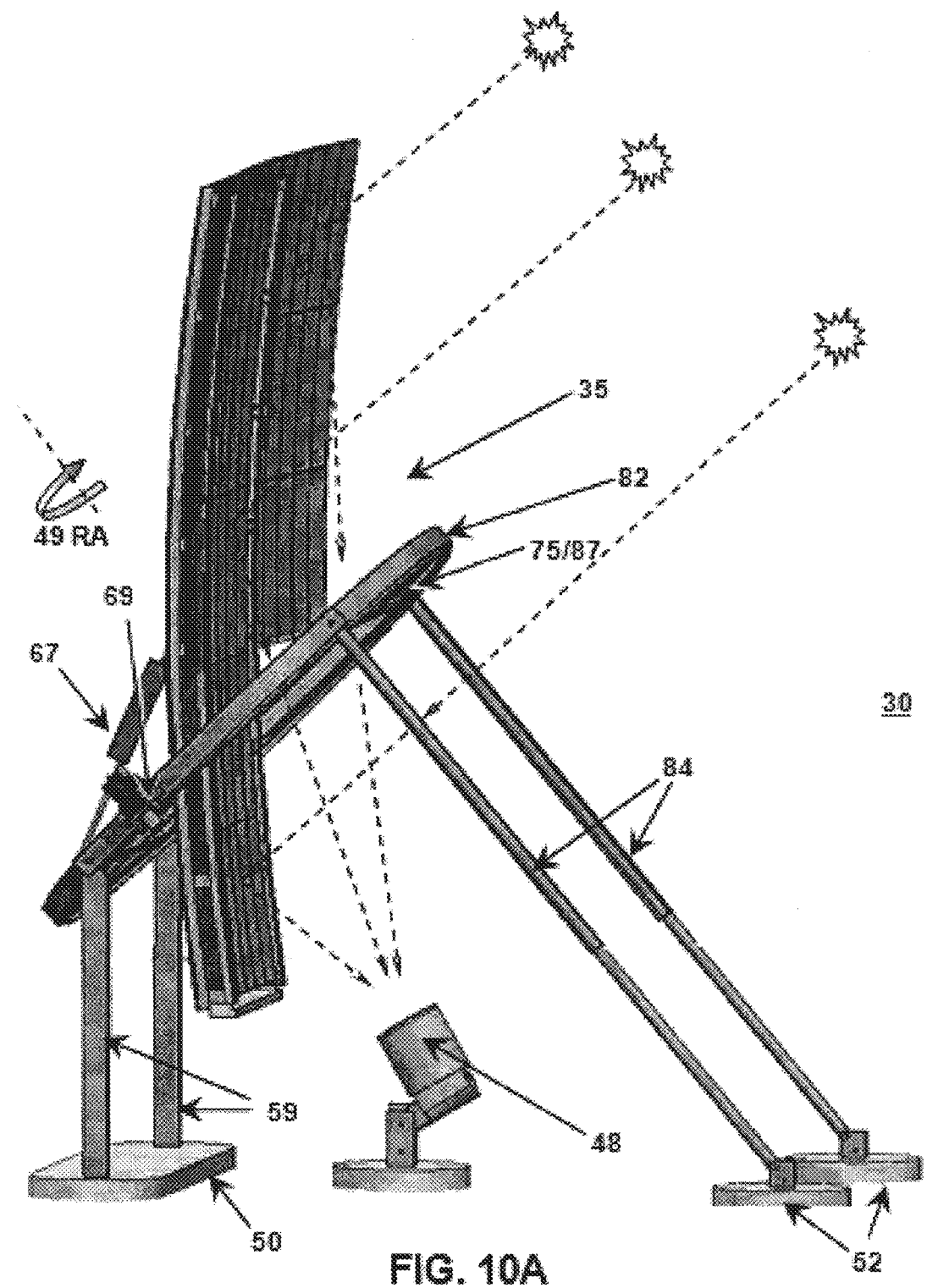
FIG. 10A is a perspective view of a solar radiation collector system arranged as a solar furnace wherein the receiver is fixed along the axis of rotation of the main supporting structure near the equatorial end thereof, and independent of the main support structure.

FIG. 10A is a perspective view of a solar radiation collector system 30 in accordance with this technology arranged as a solar furnace wherein the receiver 48 is fixed along the RA axis of rotation 49 of the gimbal 75 in the equatorial direction and mounted on a separate foundation. This embodiment, and those that follow, requires gimbal rim suspension collars 82, in this example four are connected together, fix the gimbal and gimbal rim combination 75/77 so it is stable in wind from any direction and can change orientation for construction and erection. Although the suspension and capture devices in these embodiments are arcuate members, they primarily utilize tensile strength (and therefore lightweight) with the gimbal rim inside primarily working under compression. Incoming rays of sunlight at equinox are parallel to the plane of the gimbal rim 77 and are directed into the receiver 48 by the paraboloidal concentrator assembly 35. A variety of techniques can be employed to raise, lower and orient the gimbal rim 75/77 combination. Either the two polar column devices 59 with foundations 50 and/or the equatorial column devices 84 with foundations 52 can be pivoted at each end and made of two sizes of structural members where one fits snugly inside the other and telescopes. In this illustration the polar column devices 59 are fixed and the equatorial column devices 84 telescope and pivot at both ends. With the two polar columns 59 fixed, and coaxial pin joints at the top, lengthening and shortening the equatorial columns 84 controls the orientation of the gimbal/gimbal rim 75/77 as illustrated in FIG. 10C.

Figure 10B:
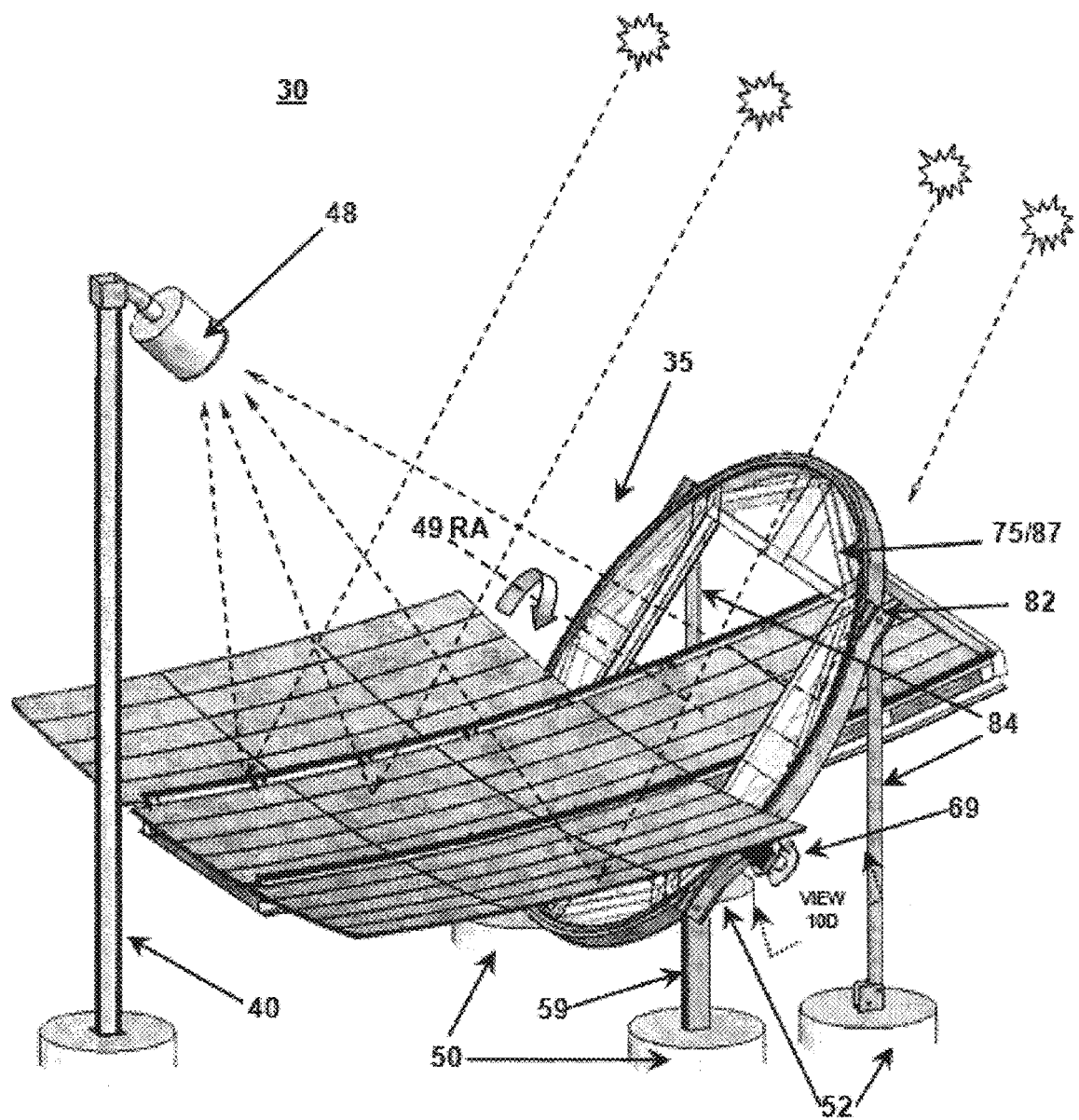
FIG. 10B is a perspective view of a solar radiation collector system arranged as a solar furnace where the receiver is fixed along the axis of rotation of the main support structure near the polar end thereof and independent of the main support structure.
Figure 10C:
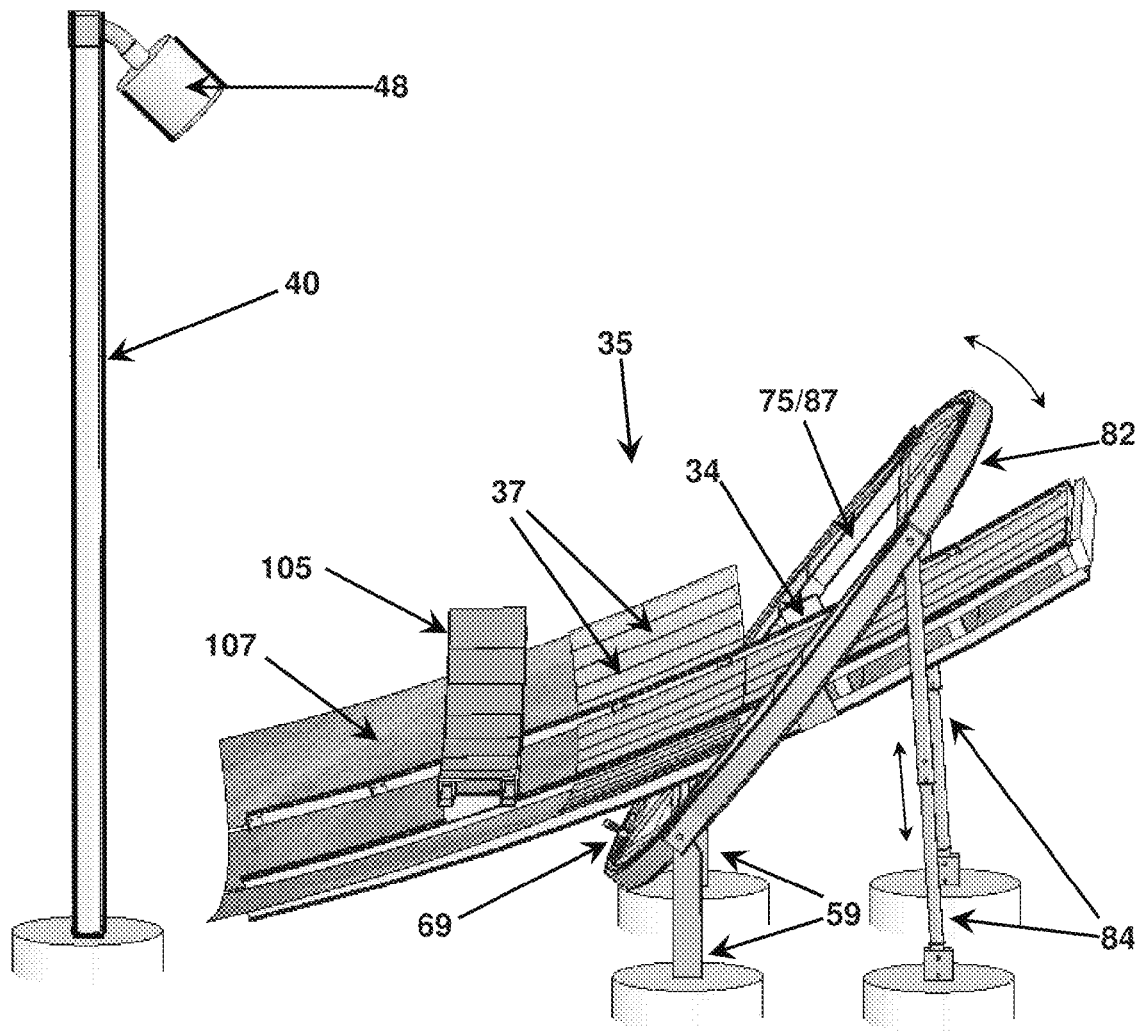
FIG. 10C is the solar radiation collector system shown in FIG. 10B during construction. It shows a concentrator access platform above the attached transducer support membrane and in position for mounting transducer elements.

The concentrator assemblies illustrated in both FIG. 10A and FIG. 10B simply pivot on an axis inside the gimbal rim 77, and direct concentrated sunlight into the respective stationary receivers 48. The relationship between the concentrator assembly 35, the sun and the receiver changes through the seasons. For a fixed parabolic concentrator assembly 35, this causes off-axis optical aberrations that would vary the energy flux distribution available at the receiver 48 unless corrective action, such as adding a device for warping the shape of the concentrator assembly 35 as a function of declination angle. Another approach would move the concentrator assembly 35 to maintain the sun-concentrator-receiver relationship which would require moving the entire concentrator in relation to the gimbals/rim devices 75/87 (along with moving a counterweight in the opposite direction to keep the center of gravity on the axis of rotation). Lower temperature applications, such as cooking, and producing steam utilize an accommodating receiver opening would not require this sophistication.

For solar furnaces and heliostats, as well as for solar collectors where receivers move only in right ascension, the declination motion is half the excursion of the sun from its position at equinox. For this reason, the declination drive 67, in this case an electric motor powered linear drive, not shown, need be only half as long as would be required for a solar collector in which the receiver moves with the concentrator. Details of the RA drive 69 are shown more clearly in FIG. 10D and FIG. 10E.

FIG. 10B is a perspective view of a solar radiation collector system 30 arranged as a solar furnace in accordance with another embodiment of this technology wherein the receiver 48 is fixed along the RA axis of rotation 49 of the gimbal/arcuate rim devices 75/87 in the polar direction and mounted on a boom 40 with its own foundation. This illustration is for a site at 34 degree latitude where the plane of the gimbal/curved rim devices 75/87 is 56 degrees from horizontal. Incoming rays of sunlight at equinox are parallel to the plane of the gimbal/rim device 75/87 and are directed into the receiver 48 by the paraboloidal concentrator assembly 35.

FIG. 10C is the solar radiation collector system 30 shown in FIG. 10B during construction. It shows a concentrator access platform 105 above the attached transducer support membrane 107 and in position for mounting transducer elements 37. An arrow next to the equatorial columns 84 indicates that as these telescoping tube sets are extended or retracted, the orientation of the gimbal/arcuate rim 75/87 rotates around the pivots on top of the polar columns 59. During construction the equatorial columns 84 would be lengthened for easy access to the concentrator access platform 105 from the ground and to give head clearance for working inside the gimbal arcuate rim 75/87.

Figure 10D:
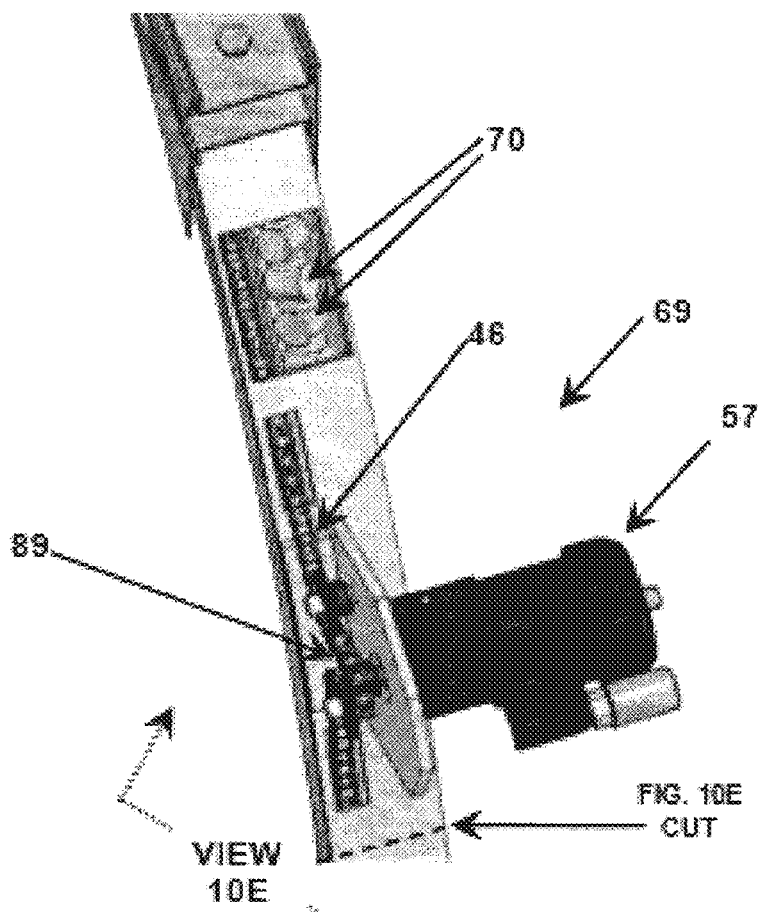
FIG. 10D and FIG. 10E are close-ups of the RA drive indicated as View 10D of FIG. 10B and View 10E of FIG. 10D that show the drive using roller chain as the flexible force transmitting device.
Figure 10E:
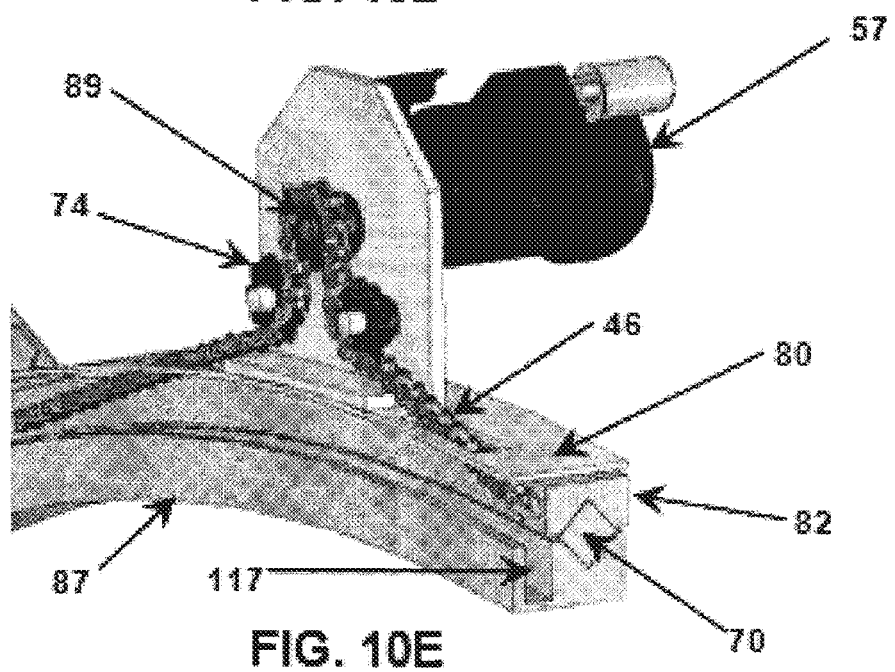

FIG. 10D and FIG. 10E are close-ups of the RA drive 69 indicated as View 10D of FIG. 10B and View 10E of FIG. 10D that show the drive using roller chain as the flexible force transmitting member 46. Also shown in FIG. 10D is the cut for the section illustrating the engagement of a gimbal rim roller 70 shown in FIG. 10E. A gear motor 57 with a drive sprocket 89 on the output shaft engages the roller chain. A cutaway in FIG. 10D shows gimbal rim rollers 70, in this example freely floating crossed rollers with spacers in between adjacent rollers that support the inner race, more clearly shown in FIG. 10E as the arcuate gimbal rim 87 inside the outer race, a continuous gimbal rim suspension collar 82. The arcuate gimbal rim 87 has a drive member engagement mechanism 117 shown as a groove to contain the flexible force transmitting member 46. The ends of the member 46 could be fastened to the gimbal rim 87, or a loop of the flexible member 46 could engage projections, not shown, that prevent the member 46 from slipping along the drive member engagement mechanism 117. RA drive member redirection mechanism 74 shown as idler sprockets can be used to insure that the flexible force transmitting member 46 fully engages RA drive sprocket 89. To prevent precipitation from entering these components and freezing, two rain-shedding radial gimbal rim covers should be attached to the stationery gimbal rim suspension collar: one on the top half and another on the bottom half with an angle (not shown) projecting inside the arcuate gimbal rim 87.

The foregoing examples utilize simple suspension members 99 attached to the lower ends of gimbal rim suspension collars 82 and utilize capture devices 95 to both insure that gimbal rim devices always engage the suspension members 99 and as flexible members for the RA drive 69. This arrangement simplifies construction and maintenance because the weight of the solar collectors is carried by the suspension member 99 that should not require attention. Except during high wind events, maintenance on the RA drive 69 can be done at any orientation by simply relieving the pretension of the flexible capture device 95. It may be appropriate in some applications to add the RA drive function to the suspension 99 but this may complicate construction and maintenance.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

I claim:

1. A solar radiation collector system, comprising:
    means for ground support coupled with an open gimbal with a rim configured for rotatably supporting the gimbal at a given orientation from the ground, the means for ground support including a first means for rotatably suspending and capturing the gimbal rim with flexible devices under tension, and providing three dimensional stability and including second means for raising, lowering and changing orientation of the gimbal;
    structural means for carrying at least one radiation transducer device connected with the gimbal;
    a device for receiving solar radiation directed to it by at least one radiation transducer element;
    first means for imparting rotational movement to the gimbal to effect a desired primary tracking motion to adjust for an apparent daily motion of the sun; and second means for moving the structural devices carrying at least one radiation transducer device to provide for a second dimension adjustment for an apparent seasonal motion of the sun.

2. A solar radiation collector system, comprising:
a gimbal device that has a first means for rotation at a first end;
a gimbal rim with an open center at a second end opposite the first end and coaxial with the first means for rotation;
a first ground support that rotatably anchors the first end of the gimbal device;
a second ground support with two columns;
a suspension device, connected to and hanging between the two columns, that supports a lower portion of the gimbal rim, enabling the gimbal rim to rotate on an axis;
a capture device which passes over the gimbal rim and is connected to the two columns of the second ground support;
a solar collector support structure that passes through the gimbal rim and pivots on coaxial pivots that support the solar collector support structure within the gimbal rim opening;
at least one radiation transducer element mounted on the solar collector support structure;
a first means for driving for imparting rotational movement for the gimbal device to adjust for an apparent motion of the sun; and
a second means for driving for moving the solar collector support structure within the open gimbal device to provide a second dimension adjustment for the apparent motion of the sun.

3. The solar radiation collector system according to claim 2, wherein the second ground support is integral with the suspension device that supports the lower portion of the gimbal rim.

4. The solar radiation collector system according to claim 2, further comprising a declination driver mounted near the first end of the gimbal device to provide secondary motion between the gimbal device and the solar collector support structure and around coaxial pivots in the gimbal rim.

5. The solar radiation collector system according to claim 2, wherein the capture device connects to a driver and provides primary tracking motion to follow the apparent motion of the sun.

6. The solar radiation collector system according to claim 2, wherein the gimbal device is anchored on the first ground support through at least one bearing.

7. The solar radiation collector system according to claim 2, wherein the suspension device includes a flexible force transmitting member.

8. The solar radiation collector system according to claim 2, wherein the suspension device supporting the gimbal rim includes webbing.

9. The solar radiation collector system according to claim 2, wherein the suspension device supporting the gimbal rim includes a cable.

10. The solar radiation collector system according to claim 2, wherein gimbal rim is arcuate.

11. The solar radiation collector system according to claim 2, wherein the gimbal rim is polygonal.

12. The solar radiation collector system according to claim 11, wherein the gimbal rim further comprises at least one roller at an apex of two sides of the polygonal rim, the roller being configured for rolling on the suspension device.

13. The solar radiation collector system according to claim 12, wherein the capture device passes over at least one of the rollers of the gimbal rim.

14. The solar radiation collector system according to claim 2, wherein the suspension device has three or more rollers that support the arcuate gimbal rim.

15. The solar radiation collector system according to claim 14, wherein at least one of the first and second means for driving further comprises a redirection mechanism on an opposite side of the means for driving and the capture member connects the means for driving and the redirection device.

16. The solar radiation collector system according to claim 2, wherein the suspension member comprises a pair of suspension collars.

17. The solar radiation collector system according to claim 2, wherein the first means for driving is integrated with the gimbal rim and moves with the gimbal rim.

18. The solar radiation collector system according to claim 2, wherein the capture device entirely surrounds the gimbal rim and is utilized by the first means for driving.

19. The solar radiation collector system according to claim 2, wherein an axis of rotation is parallel to the axis of the earth.

* * * * *